United States Patent
Chen et al.

(10) Patent No.: US 12,363,046 B2
(45) Date of Patent: Jul. 15, 2025

(54) DATA PROCESSING METHOD AND APPARATUSES, DEVICES, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Jiafeng Chen, Shenzhen (CN); Longwei Jiang, Shenzhen (CN); Honghao Liu, Shenzhen (CN); Rui Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 71 days.

(21) Appl. No.: 18/204,831

(22) Filed: Jun. 1, 2023

(65) Prior Publication Data
US 2023/0336494 A1    Oct. 19, 2023

Related U.S. Application Data

(63) Continuation of application No. PCT/CN2022/119302, filed on Sep. 16, 2022.

(30) Foreign Application Priority Data

Nov. 17, 2021  (CN) .......................... 202111360129.X

(51) Int. Cl.
*H04L 47/32* (2022.01)
*H04L 47/129* (2022.01)
*H04L 47/625* (2022.01)

(52) U.S. Cl.
CPC ............ *H04L 47/32* (2013.01); *H04L 47/129* (2022.05); *H04L 47/626* (2013.01)

(58) Field of Classification Search
CPC ..... H04L 47/32; H04L 47/129; H04L 47/626; H04L 1/18
See application file for complete search history.

(56) References Cited

U.S. PATENT DOCUMENTS 7,051,358 B2    5/2006  Hakenberg et al.
2007/0277219 A1  11/2007  Toebes et al.
(Continued)

FOREIGN PATENT DOCUMENTS

CN    101060717 A    10/2007
CN    108777665 A    11/2018
(Continued)

OTHER PUBLICATIONS

Tencent Technology, ISR, PCT/CN2022/119302, Dec. 14, 2022, 2 pgs.
(Continued)

*Primary Examiner* — David R Lazaro
*Assistant Examiner* — Zia Khurshid
(74) *Attorney, Agent, or Firm* — Morgan, Lewis & Bockius LLP

(57) ABSTRACT

A data processing method is performed by a receiving device. The method includes: receiving, through at least two network channels, data elements transmitted by a transmitting device, the data elements comprising delivery serial numbers; obtaining subsequent data elements of the received $n^{th}$ data element on the basis of the delivery serial numbers; and determining, when the subsequent data elements comprise a target data element, that a delivery result of the $n^{th}$ data element is discarded, a state of the target data element being a complete state, the target data element having a same data type as the data type of the $n^{th}$ data element, the target data element being an independent data element, the data type being determined on the basis of an effect of the data (Continued)

element, and a dependence degree of the independent data element on other data elements during post-processing being less than a specified degree.

18 Claims, 11 Drawing Sheets

(56) References Cited

U.S. PATENT DOCUMENTS

| | | | |
|---|---|---|---|
| 2009/0113152 A1* | 4/2009 | Eguchi | G06F 11/1451 711/171 |
| 2014/0269938 A1 | 9/2014 | Guedalia et al. | |
| 2019/0138500 A1* | 5/2019 | Sharangpani | G06F 16/24573 |

FOREIGN PATENT DOCUMENTS

| | | |
|---|---|---|
| CN | 108848532 A | 11/2018 |
| CN | 108932948 A | 12/2018 |
| CN | 111866969 A | 10/2020 |
| CN | 113572836 A | 10/2021 |
| CN | 114095451 A | 2/2022 |
| CN | 114342475 A | 4/2022 |
| JP | 2009528002 A | 7/2009 |
| JP | 2016187150 A | 10/2016 |
| JP | 2020171008 A | 10/2020 |
| TW | 201635805 A | 10/2016 |

OTHER PUBLICATIONS

Tencent Technology, WO, PCT/CN2022/119302, Dec. 14, 2022, 5 pgs.
Tencent Technology, IPRP, PCT/CN2022/119302, May 2, 2024, 6 pgs.
Tencent Technology, Extended European Search Report, EP Patent Application No. 22894419.5, Oct. 21, 2024, 13 pgs.
Ahmed Abd El Al et al., "Unequal Error Protection for Real-Time Video in Mobile Ad Hoc Networks Via Multi-Path Transport", Computer Communications, vol. 30, Issue 17, DOI: 10.1016/j.comcom.2007.08.042, Nov. 2007, 14 pgs.
Allen Lehopotseng Ramaboli et al., "MPEG Video Streaming Solution for Multihomed-Terminals in Heterogeneous Wireless Networks", IEEE 10th Consumer Communications and Networking Conference (CCNC), DOI: 10.1109/CCNC.2013.6488524, Jan. 2013, 6 pgs.
Shinichi Nagayama, "Path Switching Schedulers for MPTCP Streaming Video", IEEE Pacific Rim Conference on Communications, Computers and Signal Processing (PACRIM), DOI: 10.1109/PACRIM47961.2019.8985114, Aug. 2019, 6 pgs.
Syed Muhammad Asad Zaidi et al., "Multi-Channel Multi-Path Video Transmission Over Wireless Sensor Networks", IEEE 10th Consumer Communications and Networking Conference (CCNC), DOI: 10.1109/CCNC.2013.6488458, Jan. 2013, 6 pgs.
Yuanlong Cao et al., "Receiver-Assisted Partial-Reliable Multimedia Multipathing Over Multi-Homed Wireless Networks", IEEE Access, vol. 7, DOI: 10.1109/ACCESS.2019.2958986, Dec. 2019, 15 pgs.
Tencent Technology, Japanese Office Action, JP Patent Application No. 2024-514566, Mar. 18, 2025, 14 pgs.

* cited by examiner

DATA PROCESSING METHOD AND APPARATUSES, DEVICES, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/119302, entitled "DATA PROCESSING METHOD AND APPARATUSES, DEVICES, COMPUTER-READABLE STORAGE MEDIUM, AND COMPUTER PROGRAM PRODUCT" filed on Sep. 16, 2022, which is based on and claims priority to Chinese Patent Application No. 202111360129.X, entitled "DATA PROCESSING METHOD AND APPARATUSES, DEVICES, COMPUTER-READABLE STORAGE MEDIUM, AND COMPUTER PROGRAM PRODUCT" filed on Nov. 17, 2021, all of which is incorporated by reference in its entirety.

FIELD OF THE TECHNOLOGY

This application relates to a data processing technology in the field of computer applications, and in particular to a data processing method and apparatuses, devices, a computer-readable storage medium, and a computer program product.

BACKGROUND OF THE DISCLOSURE

With the rapid development of a computer communication technology, the demand for data transmission is increasingly high. In order to improve the data transmission efficiency and stability, multiple network channels can be used for data transmission.

Generally, when data transmission is carried out by multiple network channels, there is often a situation where a network channel cannot meet a transmission requirement (such as a network channel is interrupted). At this time, a transmitter needs to confirm whether all data elements transmitted in the network channel have been received by a receiver and needs to perform retransmission, while for the data elements, the receiver needs to wait to receive remaining unreceived data. Thus, in a multichannel transmission process, the time cost of data element transmission is high, which affects the data processing efficiency of multichannel transmission.

SUMMARY

Embodiments of this application provide a data processing method and apparatuses, devices, a computer-readable storage medium, and a computer program product, which can improve the data processing efficiency in a multichannel transmission process.

Technical solutions in the embodiments of this application are implemented as follows:

The embodiments of this application provide a data processing method, performed by a receiving device and the method including:
  receiving, through at least two network channels, data elements transmitted by a transmitting device, the data elements including delivery serial numbers;
  obtaining subsequent data elements of the received $n^{th}$ data element on the basis of the delivery serial numbers when a received $n^{th}$ data element is a to-be-determined data element, a state of the to-be-determined data element being an incomplete state, and a delivery type of the to-be-determined data element being a discardable type, the state being determined on the basis of whether all data of the data elements is received, and the delivery type being determined on the basis of two kinds of information: a dependence degree of other data elements on the data element during post-processing and a degree of influence on a post-processing result, and n being a positive integer; and
  determining, when the subsequent data elements include a target data element, that a delivery result of the $n^{th}$ data element is discarded, a state of the target data element being a complete state, the target data element having a same data type as the data type of the $n^{th}$ data element, the target data element being an independent data element, the data type being determined on the basis of an effect of the data element, and a dependence degree of the independent data element on other data elements during post-processing being less than a specified degree.

The embodiments of this application further provide a data processing method, performed by a transmitting device and including:
  transmitting data elements to a receiving device through at least two network channels, the data elements including delivery serial numbers;
  obtaining a delivery type of an $n^{th}$ data element in response to a switching instruction in a transmitting process of the data elements, the switching instruction being used for switching the network channel used for transmitting the $n^{th}$ data element, and the delivery type being determined on the basis of following two kinds of information: a dependence degree of other data elements on the data element during post-processing and a degree of influence on a post-processing result, and n being a positive integer; and
  canceling transmitting the $n^{th}$ data element to the receiving device when the delivery type of the $n^{th}$ data element is a discardable type and that subsequent data elements include a target data element, the subsequent data elements being transmitted data elements with delivery serial numbers behind the $n^{th}$ data element, a state of the target data element being a complete state, the target data element having a same data type as a data type of the $n^{th}$ data element, the target data element being an independent data element, the state being determined on the basis of whether the receiving device receives all data of the data elements, the data type being determined on the basis of an effect of the data element, and a dependence degree of the independent data element on other data elements during post-processing being less than a specified degree.

The embodiments of this application provide a receiving device for data processing, including:
  a first memory, configured to store computer-executable instructions; and
  a first processor, configured to implement, when executing the computer-executable instructions stored in the first memory, the data processing method provided in the embodiments of this application and applied to the receiving device.

The embodiments of this application provide a transmitting device for data processing, including:
  a second memory, configured to store computer-executable instructions; and a second processor, configured to implement, when executing the computer-executable instructions stored in the second memory, the data processing method provided in the embodiments of this application and applied to the transmitting device.

The embodiments of this application have the following beneficial effects: In a multichannel transmission process, when some data of a data element (the $n^{th}$ data element) currently received by a receiver is received (referred to as an incomplete state) due to network channel switching, if the currently received data element is of a discardable type, it indicates that a dependence degree of other data elements on the currently received data element during post-processing and a degree of influence on a post-processing result are both less than a specified value. Then, if it is determined that the subsequent data elements with the delivery serial numbers behind the currently received data element include a target data element (capable of independently completing post-processed data elements having the same effect as the effect of the currently received data element), the transmitting device directly transmits subsequent untransmitted data elements, and the receiving device discards the currently received data element. In this way, a duration of acknowledging retransmission of the transmitting device and a duration of waiting for data of the receiving device are reduced. Thus, the data element transmission time costs of network channel switching can be reduced, and the data processing efficiency in the process of multichannel transmission can be improved.

DESCRIPTION OF EMBODIMENTS

Figure 1:
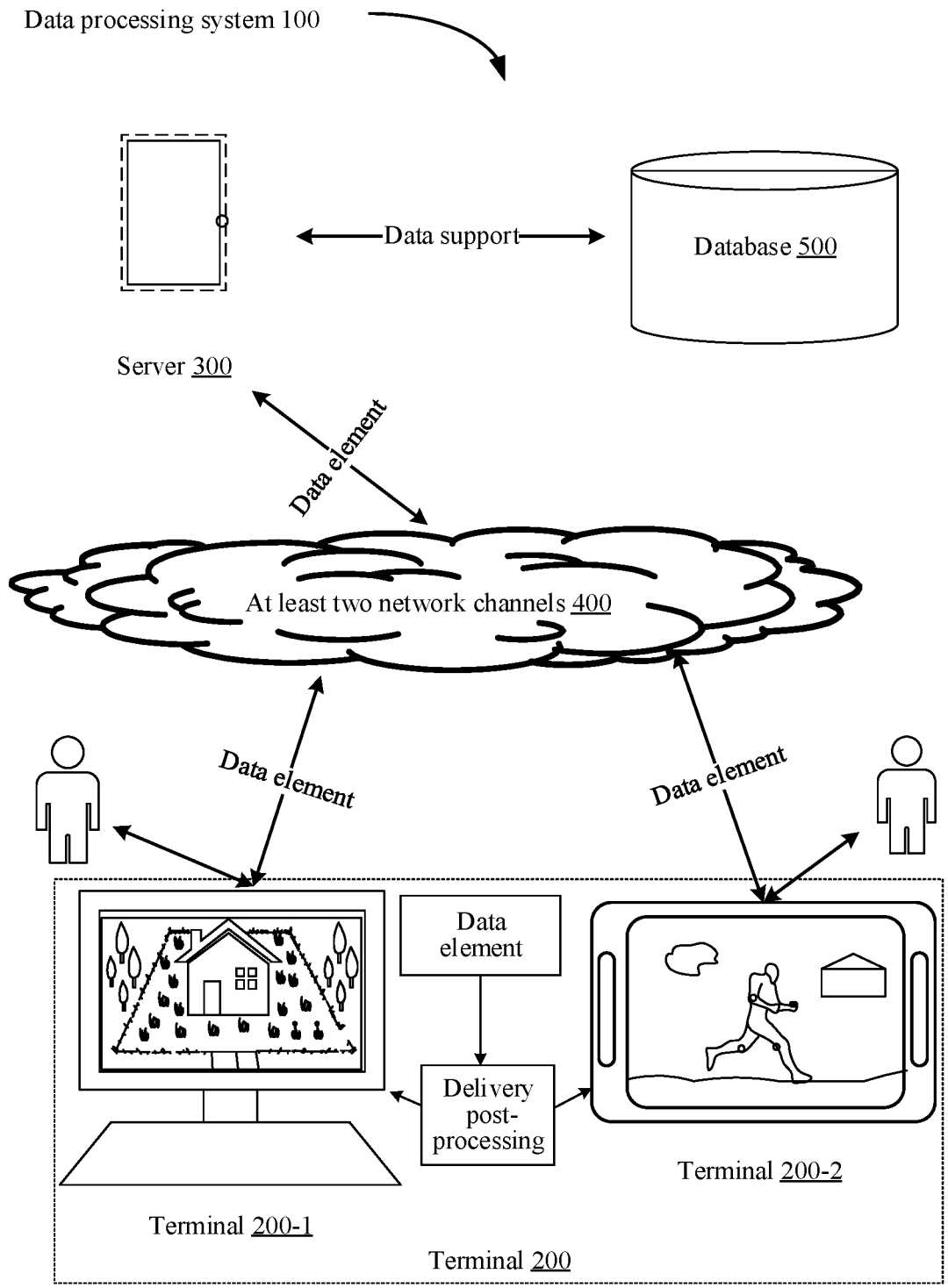
FIG. 1 is a schematic diagram of an architecture of a data processing system according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following description, the term "first\second\third" is merely used to distinguish similar objects and does not represent a specific order of the objects. It may be understood that "first\second\third" can be interchanged in a specific order or precedence where permitted, to enable the embodiments of this application described herein to be implemented in a sequence other than that illustrated or described here.

Unless otherwise defined, all technical and scientific terms used in the embodiments of this application have the same meaning as commonly understood by those skilled in the art of this application. Terms used in the embodiments of this application are merely intended to describe objectives of the embodiments of this application, but are not intended to limit this application.

Before the embodiments of this application are further described in detail, a description is made on nouns and terms in the embodiments of this application, and the nouns and terms in the embodiments of this application are applicable to the following explanations.

1) Cloud computing is a computing mode that distributes computing tasks to a resource pool composed of a large number of computers to enable various application systems to obtain computing power, storage spaces, and information services as needed. A network that provides resources for the resource pool is referred to as "cloud". Users think that resources in the "cloud" can be infinitely expanded and can be obtained at any time, used on demand, expanded at any time, and paid for according to use.

2) Cloud gaming, also referred to as game on demand, is an online gaming technology based on a cloud computing technology. A cloud gaming technology enables a thin client with a graphics processing and data computing capabilities lower than a specified capability to run games smoothly. In a cloud gaming scenario, a game is not run on a game terminal of a player, but on a cloud server, and a game scenario is rendered by the cloud server as an audio and video stream for transmission to the game terminal through a network. The graphics operation and data processing capabilities of the game terminal of the player is lower than the specified capability, but the game terminal can run the game by a basic streaming media playing capability and a capability of obtaining input instructions of the player and transmitting same to the cloud server. The data processing method provided in the embodiments of this application can be applied to scenarios of multichannel transmission in cloud games.

3) Network channel, used for transmitting data, can be a transmission channel determined on the basis of a network and/or a transmission protocol. The network is for example the fourth generation (4G) mobile communication network, the fifth generation (5G) mobile communication network, and wireless compatibility authentication (Wi Fi) networks at various frequency bands. The transmission protocol is for example Transmission Control Protocol (TCP) and User Datagram Protocol (UDP).

4) Multichannel transmission refers to processing of transmitting multiple data elements on multiple network channels at the same time. The multiple data elements can be in a same network session. In the embodiments of this application, the process of using at least two network channels to transmit data elements is the multichannel transmission.

5) Multichannel switching refers to a process of switching a data element in a network session from one network channel to another network channel for transmission due to network reasons.

Embodiments of this application provide a data processing method and apparatuses, devices, a computer-readable storage medium, and a computer program product, which can improve the data processing efficiency in a multichannel transmission process. The following describes exemplary applications of a transmitting device and a receiving device according to the embodiments of this application. The transmitting device and the receiving device of the embodiments of this application may be implemented as a smartphone, a smartwatch, a notebook computer, a tablet computer, a desk computer, an intelligent TV, a set-top box, an intelligent vehicle-mounted device, a portable music player, a personal digital assistant, a special message device, a portable game device, an intelligent speaker, and various types of terminals, or may be implemented as a server. The server may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), big data, and artificial intelligence platforms. The devices may be implemented as a terminal and a server. An exemplary application will be explained below when the transmitting device is implemented as a server and the receiving device is implemented as a terminal.

Referring to FIG. 1, FIG. 1 is a schematic diagram of an architecture of a data processing system according to an embodiment of this application. As shown in FIG. 1, a data processing application is supported. In a data processing system 100, a terminal 200 (referred to as a receiving device. A terminal 200-1 and a terminal 200-2 are exemplarily shown) and a server 300 (referred to as a transmitting device) perform data transmission via at least two network channels 400. In addition, the data processing system 100 further includes a database 500 used for providing a data support for the server 300. Moreover, FIG. 1 shows a situation where the database 500 is independent of the server 300. In addition, the database 500 may also be integrated in the server 300. This embodiment of this application does not limit this.

The terminal 200 is configured to: transmit data elements to the server 300 through the at least two network channels 400, the data elements including delivery serial numbers; obtain subsequent data elements of the received $n^{th}$ data element on the basis of the delivery serial numbers when a received $n^{th}$ data element is a to-be-determined data element, a state of the to-be-determined data element being an incomplete state, and a delivery type of the to-be-determined data element being a discardable type, the state being determined on the basis of whether all data of the data elements is received, and the delivery type being determined on the basis of two kinds of information: a dependence degree of other data elements on the data element during post-processing and a degree of influence on a post-processing result, and n being a positive integer; and determine, when the subsequent data elements include a target data element, that a delivery result of the $n^{th}$ data element is discarded, a state of the target data element being a complete state, the target data element having a same data type as the data type of the $n^{th}$ data element, the target data element being an independent data element, the data type being determined on the basis of an effect of the data element, and a dependence degree of the independent data element on other data elements during post-processing being less than a specified degree. The terminal is also configured to deliver and post-process the data elements to play audios and videos (for example, game pictures rendered in the terminal 200-1 and the terminal 200-2).

The server 300 is configured to: transmit the data elements to the receiving device through the at least two network channels; obtain a delivery type of an $n^{th}$ data element in response to a switching instruction in a transmitting process of the data elements, the switching instruction being used for switching the network channel used for transmitting the $n^{th}$ data element; and cancel transmitting the $n^{th}$ data element to the receiving device when the delivery type of the $n^{th}$ data element is a discardable type and that subsequent data elements include a target data element, the subsequent data elements being transmitted data elements with delivery serial numbers behind the $n^{th}$ data element.

The transmitting device and the receiving device are opposite. The transmitting device in one application scenario may be the receiving device in another application scenario.

In some embodiments, the terminal 200 and the server 300 can be directly or indirectly connected through wired or wireless communication. When the terminal 200 and the server 300 are connected through a network, the network can be a wide area network, a local area network, or a combination of the wide area network and the local area network. This embodiment of this application does not make restrictions.

Figure 2:
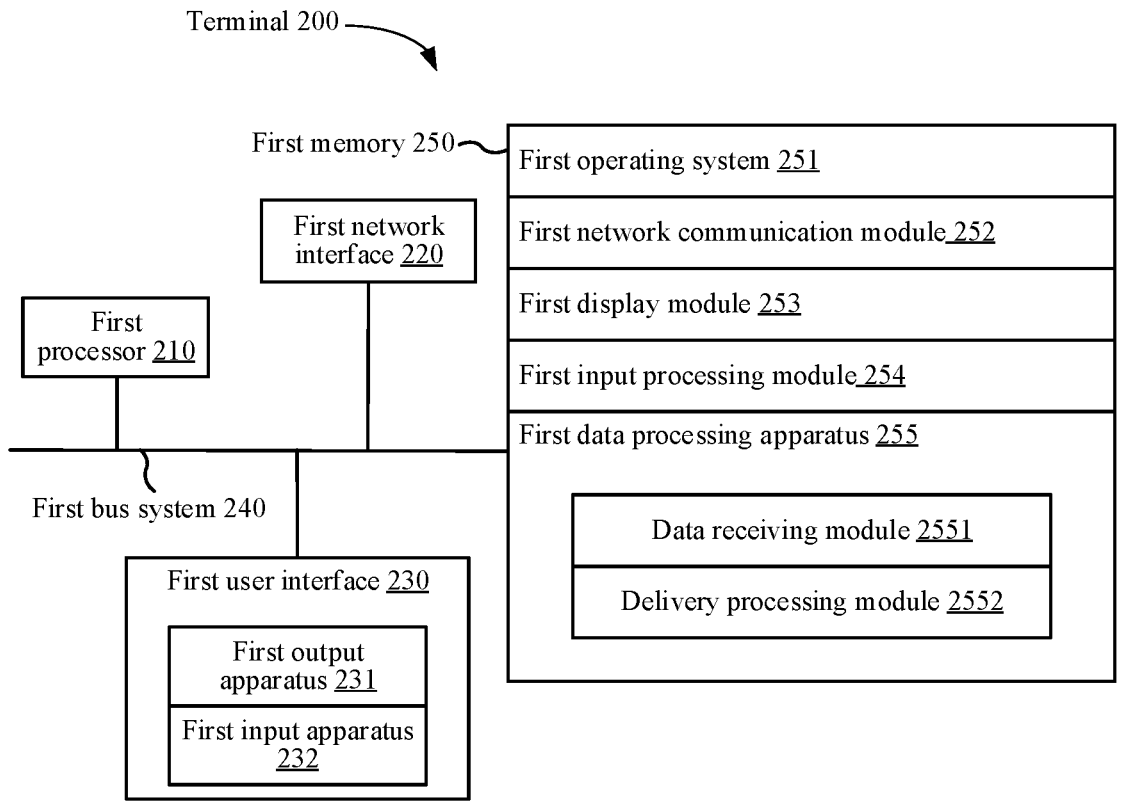
FIG. 2 is a schematic diagram of a composition structure of a terminal in FIG. 1 according to an embodiment of this application.

Referring to FIG. 2, FIG. 2 is a schematic diagram of a composition structure of a terminal in FIG. 1 according to an embodiment of this application. The terminal 200 shown in FIG. 2 includes: at least one first processor 210, a first memory 250, at least one first network interface 220, and a first user interface 230. The various components in the terminal 200 are coupled together by using a first bus system 240. It can be understood that the first bus system 240 is configured to implement connection and communication between the components. In addition to a data bus, the first bus system 240 further includes a power bus, a control bus, and a state signal bus. But, for ease of clear description, all types of buses in FIG. 2 are marked as the first bus system 240.

The first processor 210 may be an integrated circuit chip having a signal processing capability, such as a general purpose processor, a Digital Signal Processor (DSP), or other programmable logic devices, a discrete gate or transistor logic device, and a discrete hardware assembly. The general purpose processor may be a microprocessor or any conventional processor, and the like.

The first user interface 230 includes one or more first output apparatuses 231 capable of displaying a media content, including one or more speakers and/or one or more visual display screens. The first user interface 230 further includes one or more input apparatuses 232, including a user interface component helpful to typing, such as a keyboard, a mouse, a microphone, a touch display screen, a camera, other input buttons, and a control.

The first memory 250 may be removable, unremovable, or another combination. An exemplary hardware device includes a solid-state memory, a hard disk drive, an optical disk drive, and the like. The first memory 250 alternatively includes one or more storage devices away from the first processor 210 in physical positions.

The first memory 250 may be a volatile memory or a non-volatile memory, or may include both a volatile memory and a non-volatile memory. For example, the non-volatile memory may be a read only memory (ROM), and the volatile memory may be a random access memory (RAM). The first memory 250 described in this embodiment of this application aims to include any other suitable type of memories.

In some embodiments, the first memory 250 can store data to support various operations. Examples of the data include a program, a module, and a data structure or other subsets or supersets, which are exemplified below.

A first operating system 251 includes a system program used for processing various basic system services and performing hardware-related tasks, for example, a framework layer, a core library layer, a drive layer, and the like, to implement various basic services and process hardware-based tasks.

A first network communication module 252 is configured to reach other electronic devices via one or more (wired or wireless) first network interfaces 220. Exemplarily, the first network interfaces 220 include: Bluetooth, Wi-Fi, Universal Serial Bus (USB), and the like.

A first display module 253 is configured to display information via the one or more first output apparatuses 231 (for example, a display screen and speaker) associated with the first user interface 230 (for example, a user interface used for operating peripheral devices and displaying contents and information).

A first input processing module 254 is configured to detect one or more user inputs or interactions from the one or more first input apparatuses 232 and translate the detected inputs or interactions.

In some embodiments, the first data processing apparatus provided by this embodiment of this application may be implemented in software. FIG. 2 shows the first data processing apparatus 255 stored in the first memory 250, which can be software in the form of a program and a plug-in, including following software modules: a data receiving module 2551 and a delivery processing module 2552. These modules are logic, so that they can be randomly combined or further divided according to functions achieved. The functions of the various modules will be explained below.

In some embodiments, the first data processing apparatus according to the embodiments of this application may also be implemented in hardware. For example, the first data processing apparatus according to the embodiments of this application may be a first processor in the form of a hardware decoding processor, and is programmed to implement a data processing method provided in the embodiments of this application and applied to a receiving device. For example, the first processor in the form of a hardware decoding processor may use one or more application-specific integrated circuits (ASICs), a DSP, a programmable logic device (PLD), a complex programmable logic device (CPLD), a field-programmable gate array (FPGA), or other electronic elements.

Figure 3:
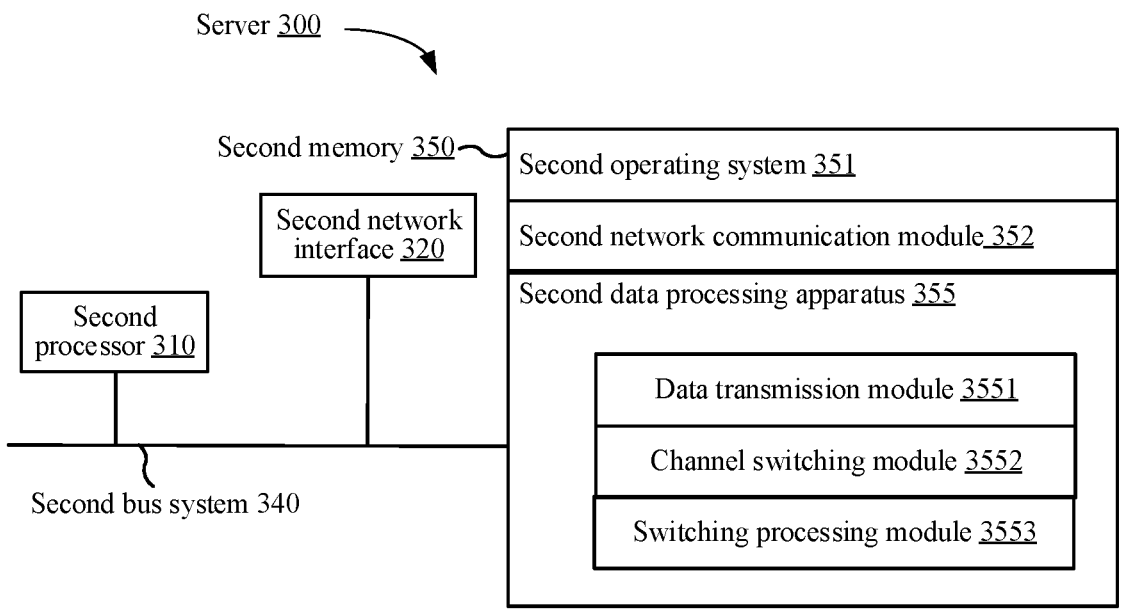
FIG. 3 is a schematic diagram of a composition structure of a server in FIG. 1 according to an embodiment of this application.

Referring to FIG. 3, FIG. 3 is a schematic diagram of a composition structure of a server in FIG. 1 according to an embodiment of this application. The server 300 shown in FIG. 3 includes: at least one second processor 310, a second memory 350, at least one second network interface 320. The various components in the server 300 are coupled together by using a second bus system 340. It may be understood that the second bus system 340 is configured to implement connection and communication between these components. In addition to a data bus, the second bus system 340 further includes a power bus, a control bus, and a state signal bus. But, for ease of clear description, all types of buses in FIG. 3 are marked as the second bus system 340.

The second processor 310 may be an integrated circuit chip having a signal processing capability, such as a general purpose processor, a DSP, or other programmable logic devices, a discrete gate or transistor logic device, and a discrete hardware assembly. The general purpose processor may be a microprocessor or any conventional processor, and the like.

The second memory 350 may be removable, unremovable, or another combination. An exemplary hardware device includes a solid-state memory, a hard disk drive, an optical disk drive, and the like. The second memory 350 alternatively includes one or more storage devices away from the second processor 310 in physical positions.

The second memory 350 may be a volatile memory or a non-volatile memory, or may include both a volatile memory and a non-volatile memory. For example, the non-volatile memory may be a ROM, and the volatile memory may be a RAM. The second memory 350 described in this embodiment of this application aims to include any other suitable type of memories.

In some embodiments, the second memory 350 can store data to support various operations. Examples of the data include a program, a module, and a data structure or other subsets or supersets, which are exemplified below.

A second operating system 351 includes a system program used for processing various basic system services and performing hardware-related tasks, for example, a framework layer, a core library layer, a drive layer, and the like, to implement various basic services and process hardware-based tasks.

A second network communication module 352 is configured to reach other electronic devices via one or more (wired or wireless) second network interfaces 320. Exemplarily, the second network interfaces 320 include: Bluetooth, Wi-Fi, USB, and the like.

In some embodiments, the second data processing apparatus provided by this embodiment of this application may be implemented in software. FIG. 3 shows the second data processing apparatus 355 stored in the second memory 350, which can be software in the form of a program and a plug-in, including following software modules: a data transmission module 3551, a channel switching module 3552 and a switching processing module 3553. These modules are logic, so that they can be randomly combined or further divided according to functions achieved. The functions of the various modules will be explained below.

In some embodiments, the second data processing apparatus according to the embodiments of this application may also be implemented in hardware. For example, the second data processing apparatus according to the embodiments of this application may be a second processor in the form of a hardware decoding processor, and is programmed to implement a data processing method provided in the embodiments of this application and applied to a transmitting device. For example, the second processor in the form of a hardware decoding processor may use one or more ASICs, a DSP, a PLD, a CPLD, an FPGA, or other electronic elements.

In some embodiments, the terminal or server may implement the data processing method provided in the embodiments of this application by running a computer program. For example, the computer program may be a native program or software module in an operating system. The computer program may be a native application (APP), which cannot be run until it is installed in the operating system, for example, a game APP, an email APP, a file management APP or an instant messaging APP. The computer program may also be a mini program, which can be run after being simply downloaded to a browser environment. The computer program may also be a mini program that can be embedded into any APP. In summary, the above computer program can be any form of application program, module, or plug-in.

The data processing methods provided by the embodiments of this application will be described below in combination with exemplary applications and implementations of the transmitting device and the receiving device provided by the embodiments of this application.

Figure 4:
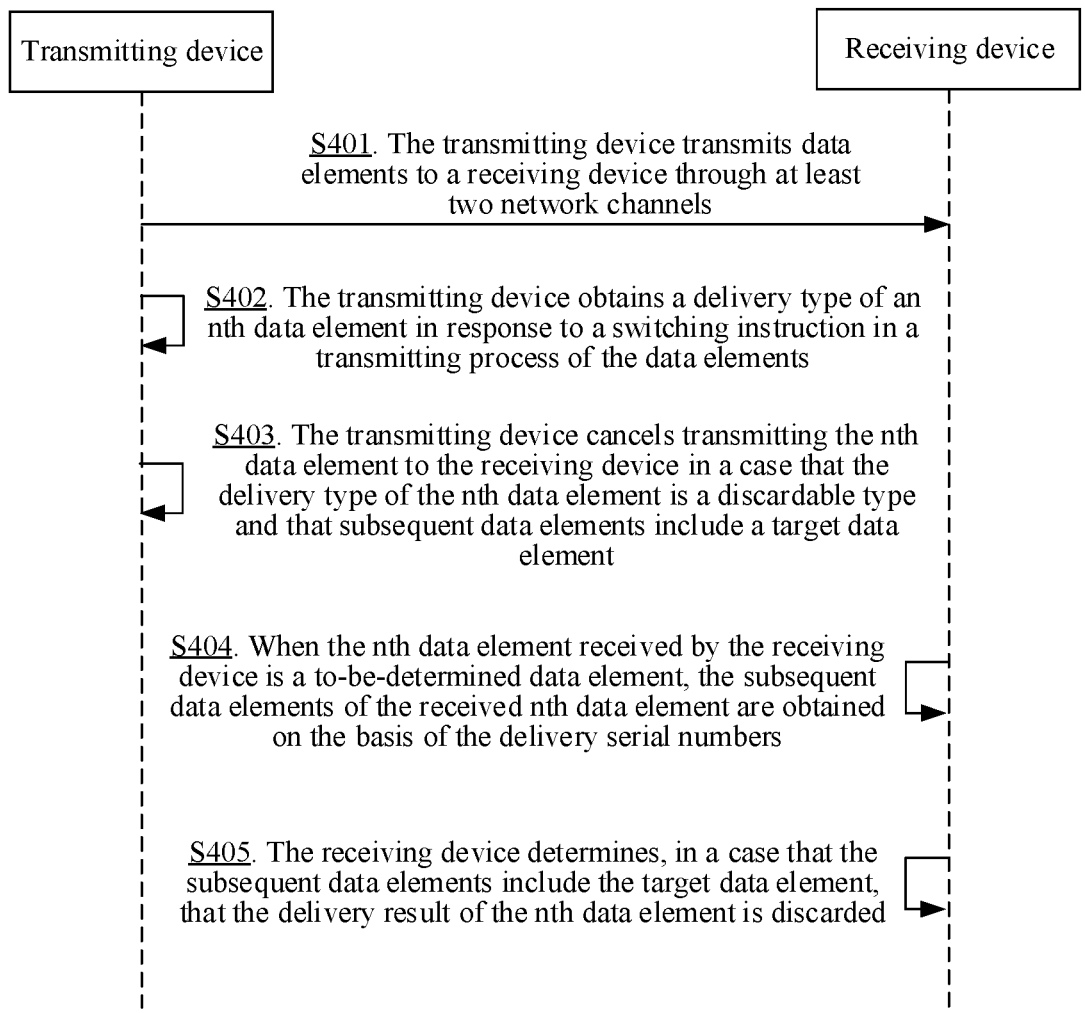
FIG. 4 is a flowchart I of a data processing method according to an embodiment of this application.

Referring to FIG. 4, FIG. 4 is a flowchart I of a data processing method according to an embodiment of this application. Steps shown in FIG. 4 will be explained.

S401. A transmitting device transmits data elements to a receiving device through at least two network channels.

In this embodiment of this application, transmission of data between the transmitting device and the receiving device is achieved through multiple network channels. Transmitted unit data is a data element (for example, one frame of audio and one frame of video), and the multiple network channels are the at least two network channels. When the transmitting device transmits the data elements to the receiving device through the at least two network channels, the receiving device correspondingly receives the data elements transmitted by the transmitting device through the at least two network channels.

The transmitting device transmits data to the receiving device to perform data processing by the receiving device to achieve an application function. For example, a server (the transmitting device) transmits audio and video data corresponding to cloud gaming or audio and video data corresponding to livestreaming to a terminal (the receiving device) to play audios and videos at the terminal. The transmitting device splits the transmitted data into the data elements and transmits the data elements in the at least two network channels. The data elements include delivery serial numbers. The delivery serial numbers represent an order in which the receiving device delivers the data elements. The delivery is used for completing post-processing of the data to achieve this application function. For example, the delivery is used for completing decoding to play the audios and the videos. The post-processing is post-delivery processing, for example, decoding and rendering. That is, the data transmitted through the at least two network channels is a coherent data element sequence. The delivery serial numbers may be data carried in the data elements by the transmitting device.

The transmitting device may transmit the data elements to the receiving device in real time. Of course, the transmitting device may transmit the data elements to the receiving device in non-real time. This embodiment of this application does not make any restrictions. In this embodiment of this application, when multichannel transmission is used to improve the data element transmission efficiency, the data elements are transmitted in real time through the multiple network channels.

S402. The transmitting device obtains a delivery type of an $n^{th}$ data element in response to a switching instruction in a transmitting process of the data elements.

In this embodiment of this application, in the process that the transmitting device transmits the data elements to the receiving device through the multiple network channels, due to the uncertainness of a network for transmission, when a network channel switching event is triggered due to network or other reasons, the transmitting device also obtains a switching instruction. At this time, the transmitting device performs network channel switching in response to the switching instruction, and obtains a data element for network channel switching indicated by the switching instruction, thus obtaining the $n^{th}$ data element.

The network channel switching event refers to an event of switching a network channel, including a triggering condition and a switching policy. The triggering condition is at least one of a connection state, a transmission speed and an applicable scenario of the network channel. The switching policy refers to a rule for switching the network channel, and is used for determining a new network channel for transmitting data elements, such as a priority. The network channel after switching refers to a new network channel for data element transmission indicated by the switching instruction. The $n^{th}$ data element is a data element being transmitted in a to-be-switched network channel the switching instruction is received. The switching instruction is used for switching the network channel transmitting the $n^{th}$ data element, and n is a positive integer, such as 1, 9, and 22. The delivery type is determined on the basis of a dependence degree of other data elements during post-processing and a degree of influence on a post-processing result. A processing manner used for determining the $n^{th}$ data element is to acknowledge and retransmit or to discard and directly transmit subsequent data elements.

Figure 5:
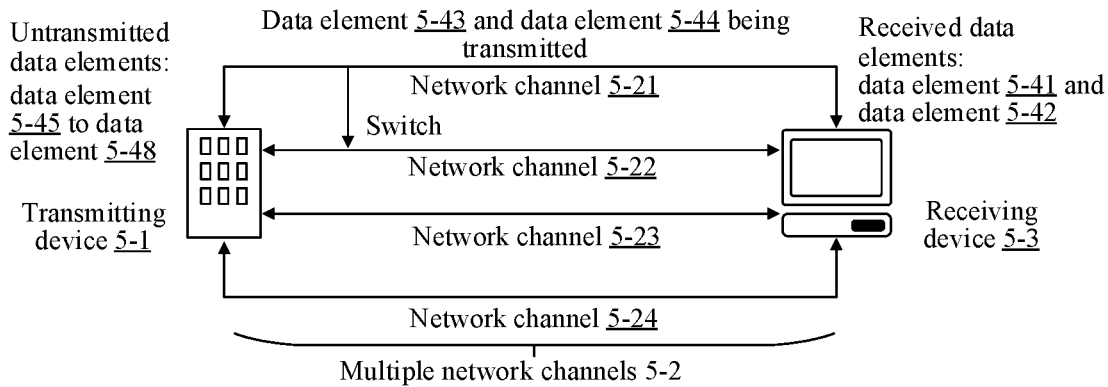
FIG. 5 is a schematic diagram of an exemplary switching of multiple network channels according to an embodiment of this application.

Exemplarily, referring to FIG. 5, FIG. 5 is a schematic diagram of an exemplary switching of multiple network channels according to an embodiment of this application. As shown in FIG. 5, a transmitting device 5-1 transmits data to a receiving device 5-3 through multiple network channels 5-2. The transmitted data is a data element sequence. The data element sequence includes a data element 5-41 to a data element 5-48, and the multiple network channels 5-2 includes a network channel 5-21 to a network channel 5-24. The data element 5-45 to the data element 5-48 are untransmitted data elements. The data element 5-41 and the data element 5-42 are transmitted through the network channel 5-22, and the data element 5-43 and the data element 5-44 are transmitted through the network channel 5-21. After transmission for a period of time, the receiving device 5-3 receives the data element 5-41 and the data element 5-42 transmitted through the network channel 5-22. At this time, if network channel switching is required due to a network reason, the transmitting device 5-1 switches the transmission of the data element 5-43 and the data element 5-44 from the network channel 5-21 to the network channel 5-22. At this time, the transmitting device obtains delivery types separately corresponding to the data element 5-43 and the data element 5-44, so as to determine a processing manner after the network channel switching on the basis of the obtained delivery types.

S403. The transmitting device cancels transmitting the $n^{th}$ data element to the receiving device when the delivery type of the $n^{th}$ data element is a discardable type and that subsequent data elements include a target data element, the subsequent data elements being transmitted data elements with delivery serial numbers behind the $n^{th}$ data element.

In this embodiment of this application, the delivery type includes a discardable type and a non-discardable type. The discardable type refers to that the dependence degree on other data elements during post-processing and the degree of influence on the post-processing result are both relatively small (for example, the dependence degree on other data elements is less than a first degree threshold, and the degree of influence on the post-processing result is less than a second degree threshold). The discardable type refers to that at least one of the dependence degree on other data elements during post-processing and the degree of influence on the post-processing result is relatively large (for example, the dependence degree on other data elements is greater than the first degree threshold, and the degree of influence on the post-processing result is greater than the second degree threshold).

First, when the transmitting device determines that the delivery type of the $n^{th}$ data element is the discardable type, it indicates that even if the receiving device does not completely receive the data of the data element, the receiving data discards the data element, without affecting the post-processing of other data elements.

Then, the transmitting device determines whether the transmitted subsequent data elements with the delivery serial numbers behind the $n^{th}$ data element include the target data element. A state of the target data element is a complete state, and the target data element has a same data type as the data type of the $n^{th}$ data element, and the target data element is an independent data element. If the target data element is included, it indicates that even if the transmitting device does not acknowledge retransmission because the transmission of all the data of the $n^{th}$ data element is not completed because of the network channel switching, the receiving device can also continue to deliver the subsequent data elements and complete the post-processing by discarding the $n^{th}$ data element. Therefore, when the transmitting device determines that the delivery type of the $n^{th}$ data element is the discardable type and that the subsequent data elements includes the target data element, the transmitting device transmits the untransmitted data elements to the receiving device, and cancels transmitting the $n^{th}$ subsequent data element to the receiving device. That is, the transmitting device cancels the acknowledgment of whether all data of the $n^{th}$ data element is received by the receiving device, and cancels the processing of retransmission of the $n^{th}$ data element.

The state is determined on the basis of whether all data of the data elements has been received, and includes an incomplete state and a complete state. The complete state refers to receiving all the data of the data elements, and the incomplete state refers to receiving some data of the data elements. A data type is determined on the basis of an effect of a data element. Therefore, if the effect of the data element is the same, the data type of the data element is the same. An independent data element is a data element having a dependence degree on other data element less than the specified degree during the post-processing, that is, the independent data element is a data element that performs post-processing on the basis of its own data, such as audio frame data and key frame (Intra-Prediction, I) frame data. The subsequent data elements are at least one data element with the delivery serial number behind the $n^{th}$ data element, such as an $(n+1)^{th}$ data element, an $(n+2)$th data element, ..., and an $(n+i)^{th}$ data element, i being a positive integer greater than or equal to 0.

S404. When the $n^{th}$ data element received by the receiving device is a to-be-determined data element, the subsequent data elements of the received $n^{th}$ data element are obtained on the basis of the delivery serial numbers.

In this embodiment of this application, the receiving device receives the data elements transmitted by the transmitting device through the at least two network channels, and delivers the received data elements according to the delivery serial numbers, so as to perform post-processing on the data elements.

The receiving device determines a state of each received data element to determine whether all the data of the data element has been received. If it is determined that only some data of the currently received data element is received, it is determined that the state of the currently received data element is the incomplete state, and the currently received data element is the received $n^{th}$ data element. When it is determined that the state of the $n^{th}$ data element is the incomplete state, the receiving device determines the delivery type of the $n^{th}$ data element. If it is determined that the delivery type of the $n^{th}$ data element is the discardable type, it indicates that the dependence degree of other data elements on the $n^{th}$ data element in the incomplete state during post-processing is less than the first degree threshold and that the degree of influence on the post-processing result is less than the second degree threshold, so that the $n^{th}$ data element is discardable. At this time, the received $n^{th}$ data element is the to-be-determined data element. The state of the to-be-determined data element is the incomplete state, and the delivery type of the to-be-determined data element is the discardable type. When it is determined that the delivery type of the n' data element in the incomplete state is the discardable type, the receiving device still needs to determine the received subsequent data elements to determine whether to discard the $n^{th}$ data element.

During the transmission of the data elements, the transmitting device may carry the delivery types of the data elements in the data of the data elements for transmission. In this way, the receiving device can determine the delivery types of the data elements by reading the data of the data elements. The transmitting device can also make a determination on the basis of data reading results of the data elements, to determine the delivery types of the data elements. This embodiment of this application does not limit this.

If the receiving device determines that all the data of the $n^{th}$ data element is received, it can be determined that the state of the $n^{th}$ data element is the complete state. At this time, the $n^{th}$ data element is delivered for post-processing. That is, if the $n^{th}$ data element received by the receiving device is in the complete state, it is determined that a delivery result of the $n^{th}$ data element includes delivery processing.

S405. The receiving device determines, when the subsequent data elements include the target data element, that the delivery result of the $n^{th}$ data element is discarded.

In this embodiment of this application, the receiving device obtains the received data elements with the delivery serial numbers behind the $n^{th}$ data element, and determines whether the obtained subsequent data elements include the target data element. The state of the target data element is the complete state; the target data element has the same data type as the data type of the $n^{th}$ data element; and the target data element is an independent data element. That is, the receiving device determines whether the subsequent data elements include a data element that may skip the $n^{th}$ data element and continue the post-processing with the same effect. If such a data element is included, the receiving device determines that the processing manner of the $n^{th}$ data element is discarding, that is, the delivery result is discarded, and no delivery is performed. That is, the receiving device no longer waits for receiving data for unreceived data not of the $n^{th}$ data element.

The subsequent data elements may be a data element sequence adjacent to the $n^{th}$ data element in the delivery serial numbers, or a data element sequence not adjacent to the $n^{th}$ data element in the delivery serial numbers. The delivery serial numbers of the various data elements in the data element sequence may be adjacent or not adjacent. This embodiment of this application does not limit this.

Figure 6A:
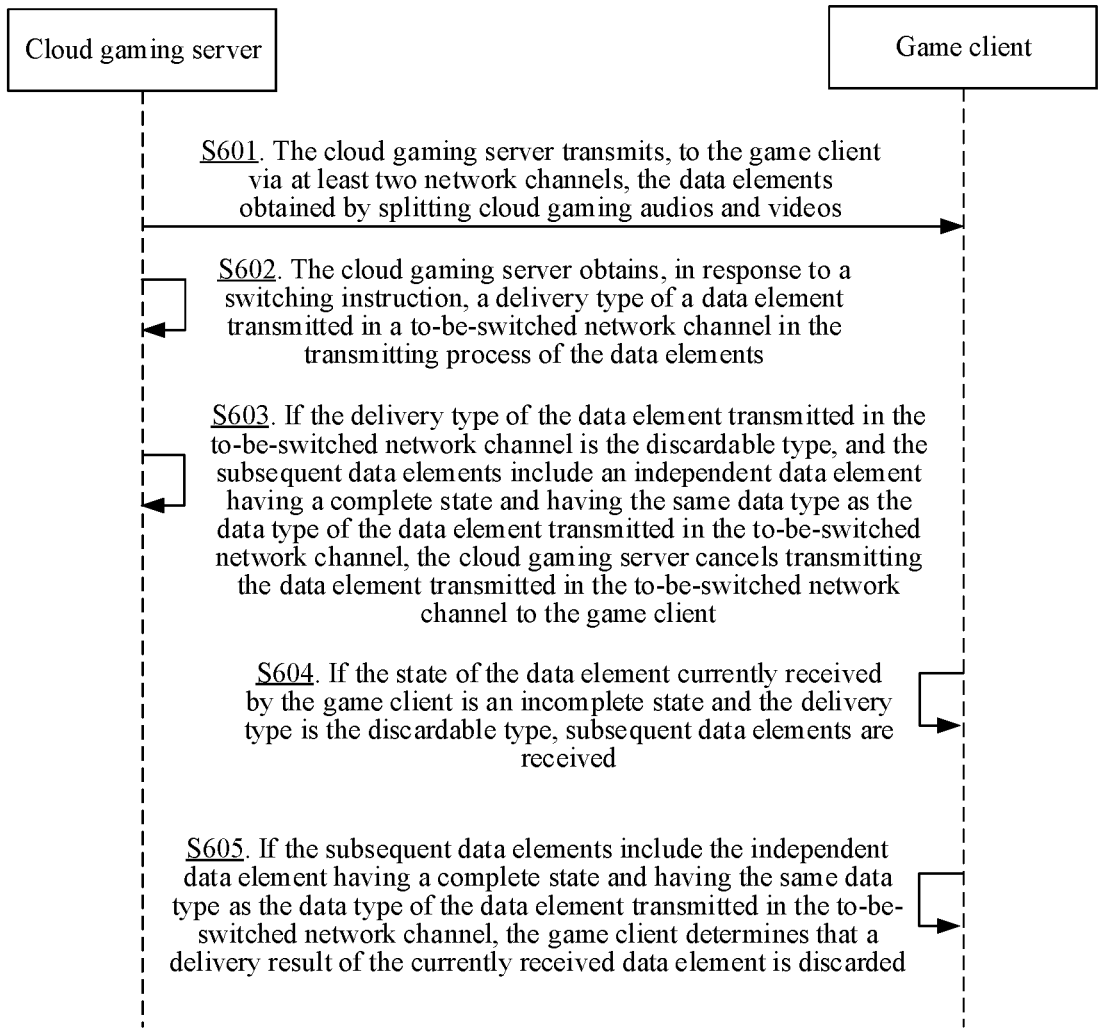
FIG. 6a is an interaction diagram of an exemplary data processing method according to an embodiment of this application.

Exemplarily, referring to FIG. 6a, FIG. 6a is an interaction diagram of an exemplary data processing method according to an embodiment of this application. As shown in FIG. 6a, this exemplary data processing method describes a data processing process that a cloud gaming server (referred to as a transmitting device) transmits data elements obtained by splitting cloud gaming audios and videos to a game client (referred to as a receiving device) in a cloud gaming scenario, including S601 to S606. The various steps will be described separately below.

S601. The cloud gaming server transmits, to the game client via at least two network channels, the data elements obtained by splitting cloud gaming audios and videos.

The cloud gaming server uses multichannel transmission to transmit, to the game client, the data elements obtained by splitting cloud gaming audios and videos.

S602. The cloud gaming server obtains, in response to a switching instruction, a delivery type of a data element (referred to as an $n^{th}$ data element) transmitted in a to-be-switched network channel in the transmitting process of the data elements.

If the cloud gaming server determines to perform network channel switching on the basis of a preset network channel switching policy, the cloud gaming server generates the switching instruction to switch the network channel.

S603. If the delivery type of the data element transmitted in the to-be-switched network channel is the discardable type, and the subsequent data elements include an independent data element having a complete state and having the same data type as the data type of the data element transmitted in the to-be-switched network channel, the cloud gaming server cancels transmitting the data element transmitted in the to-be-switched network channel to the game client.

If the network channel switching is performed, the cloud gaming server side determines whether the data element being transmitted in the to-be-switched network channel include a data element that can independently complete the same type of post-processing (for example, a key frame that can independently render a game picture). If so, the cloud gaming server side cancels transmitting, to the game client, the data element transmitted in the to-be-switched network channel, and directly transmits untransmitted data elements on the basis of a network channel after switching, which reduces resource consumption of acknowledging retransmission.

S604. If the state of the data element currently received by the game client is an incomplete state and the delivery type is the discardable type, subsequent data elements are received.

The currently received data element is the data element transmitted in the to-be-switched network channel.

S605. If the subsequent data elements include the independent data element having a complete state and having the same data type as the data type of the data element transmitted in the to-be-switched network channel, the game client determines that a delivery result of the currently received data element is discarded.

If it is confirmed that the received data element transmitted in the to-be-switched network channel is incomplete due to splitting performed by the cloud gaming server on the network channel, that the $n^{th}$ data element is a discardable type, and that the subsequent data elements include the data element that can independently complete the same type of post-processing, the currently received data element is discarded, and subsequent post-processing of the same type of data elements is continued to be performed. In this way, the waiting time for receiving data elements with incomplete states is shortened, and the rendering effect of cloud gaming is improved.

Figure 6B:
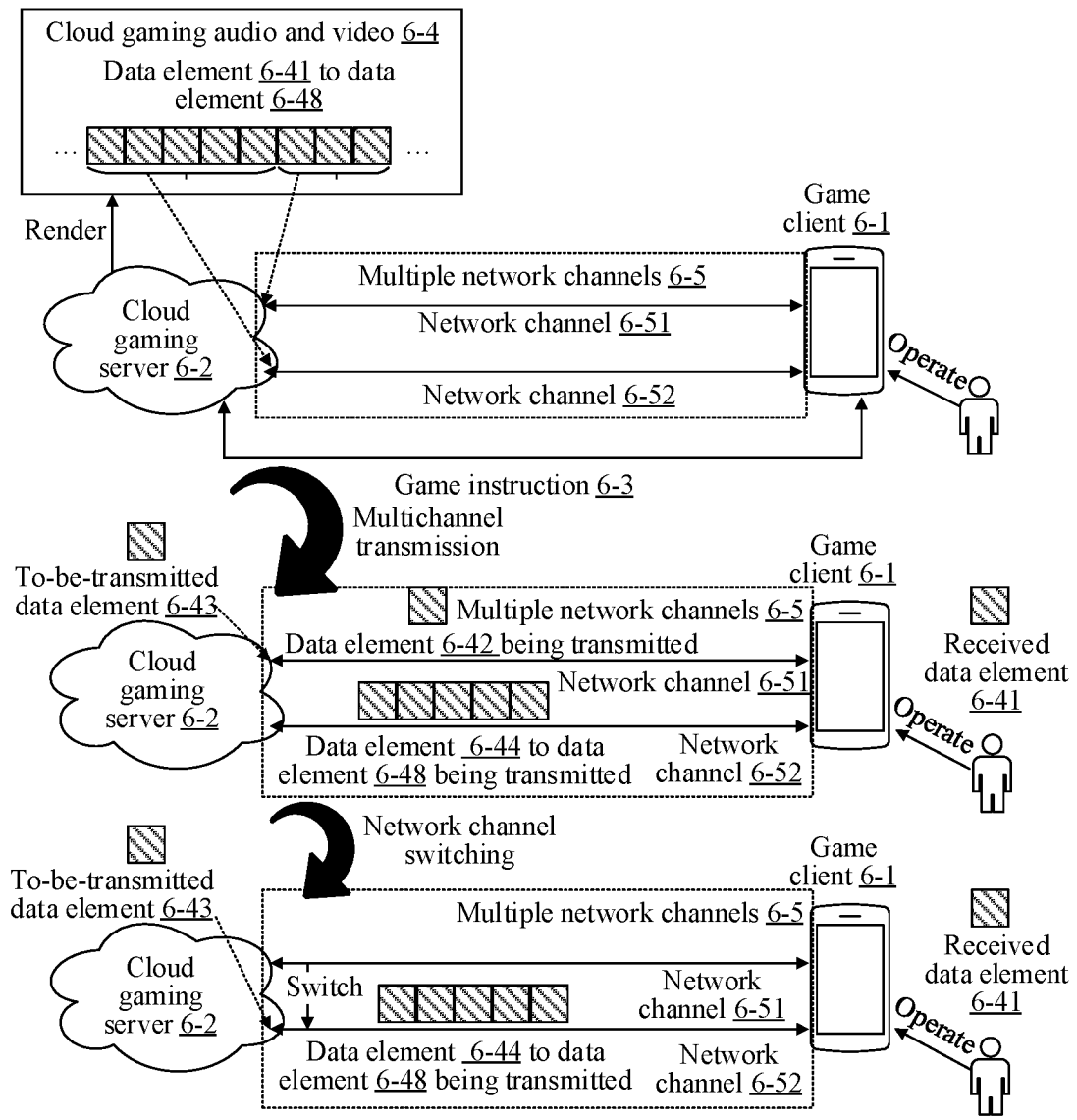
FIG. 6b is a diagram of a system architecture of an exemplary cloud gaming application according to an embodiment of this application.

FIG. 6a is achieved on the basis of a system architecture of a cloud gaming application scenario. The following describes the system architecture of the cloud gaming application scenario. Referring to FIG. 6b, FIG. 6b is a diagram of a system architecture of an exemplary cloud gaming application according to an embodiment of this application. As shown in FIG. 6b, the system architecture of the exemplary cloud gaming application includes a game client 6-1 and a cloud gaming server 6-2. The game client 6-1 is configured to transmit a game instruction 6-3 to the cloud gaming server 6-2 in response to an operation performed by a game user on a virtual scene interface. At this point, the cloud gaming server 6-2 performs rendering on the basis of the game instruction 6-3 to obtain a cloud gaming audio and video 6-4, and splits the game audio and video 6-4 into data elements (a data element 6-41 to a data element 6-48 are shown as an example) for transmission through multiple network channels 6-5 (a network channel 6-51 and a network channel 6-52 are shown as an example) (the data element 6-41 to the data element 6-43 are transmitted through the network channels 6-51, and the data element 6-44 to the data element 6-48 are transmitted through the network channels 6-52).

A transmission situation of a current data element is as follows: The cloud gaming server 6-2 is transmitting the data element 6-44 to the data element 6-48 on the network channel 6-52. The game client 6-1 has received the data element 6-41 and is receiving the data element 6-42 transmitted through the network channel 6-51. The cloud gaming server 6-2 further includes a to-be-transmitted data element 6-43. At this time, the cloud gaming server 6-2 triggers a network channel switching event, and determines to switch the data element transmitted on the network channel 6-51 to the network channel 6-52 for transmission. The data element 6-42 (referred to as an $n^{th}$ data element) being transmitted will be processed through the data processing method shown in FIG. 6a, and the data element 6-43 will be transmitted through the network channel 6-52.

Figure 6C:
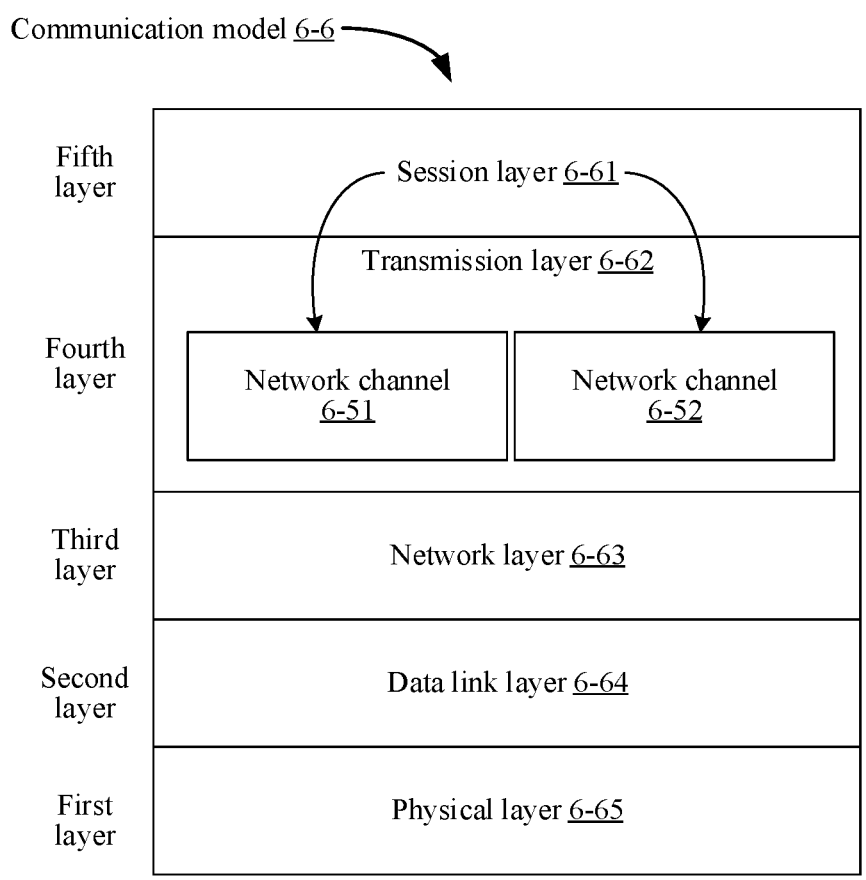
FIG. 6c is a diagram of an exemplary communication model architecture according to an embodiment of this application.

In FIG. 6a and FIG. 6b, the data transmission performed by the cloud gaming server to the game client is achieved on the basis of a communication model architecture shown in FIG. 6c. As shown in FIG. 6c, it is shown that a communication model 6-6 includes a session layer 6-61, a transmission layer 6-62, a network layer 6-63, a data link layer 6-64, and a physical layer 6-65. The transmission layer 6-62 includes multiple network channels (a network channel 6-51 corresponding to a TCP and a network channel 6-52 corresponding to a UDP), to enable this embodiment of this application to achieve multichannel transmission. When the cloud gaming server transmits, to the game client, the data elements obtained by splitting the cloud gaming audio and video, the first physical layer 6-65 is used for realizing transmission of an original bit stream on mechanical, electronic and timing interface communication channels. The second data link layer 6-64 is used for performing physical addressing and transforming the original bit stream into a logical transmission line. The first layer and the second layer usually belong to a network card and a network cable. The third network layer 6-63 is used for controlling running of subnets, such as logical addressing, packet transmission, and routing selection. The fourth transmission layer 6-62 is used for transmitting the data elements to the game client and receiving responses from the game client. The fifth session layer 6-61 is used for establishing and managing sessions with the game client, and distributing the data elements to the multiple network channels of the transmission layer 6-62.

It is understood that in a multichannel transmission process, when some data of a data element currently received by a receiver is received due to network channel switching, if the currently received data element is a discardable type, it indicates that a dependence degree of other data elements on the currently received data element during post-processing and a degree of influence on a post-processing result are both less than a specified value. Then, if it is determined that the subsequent data elements with the delivery serial numbers behind the delivery serial number of the currently received data element include a target data element, the transmitting device directly transmits subsequent untransmitted data elements, and the receiving device discards the currently received data element. In this way, a duration of acknowledging retransmission of the transmitting device and a duration of waiting for data of the receiving device are reduced. Thus, the data element transmission time costs of network channel switching can be reduced, and the data processing efficiency in the process of multichannel transmission can be improved.

Figure 6D:
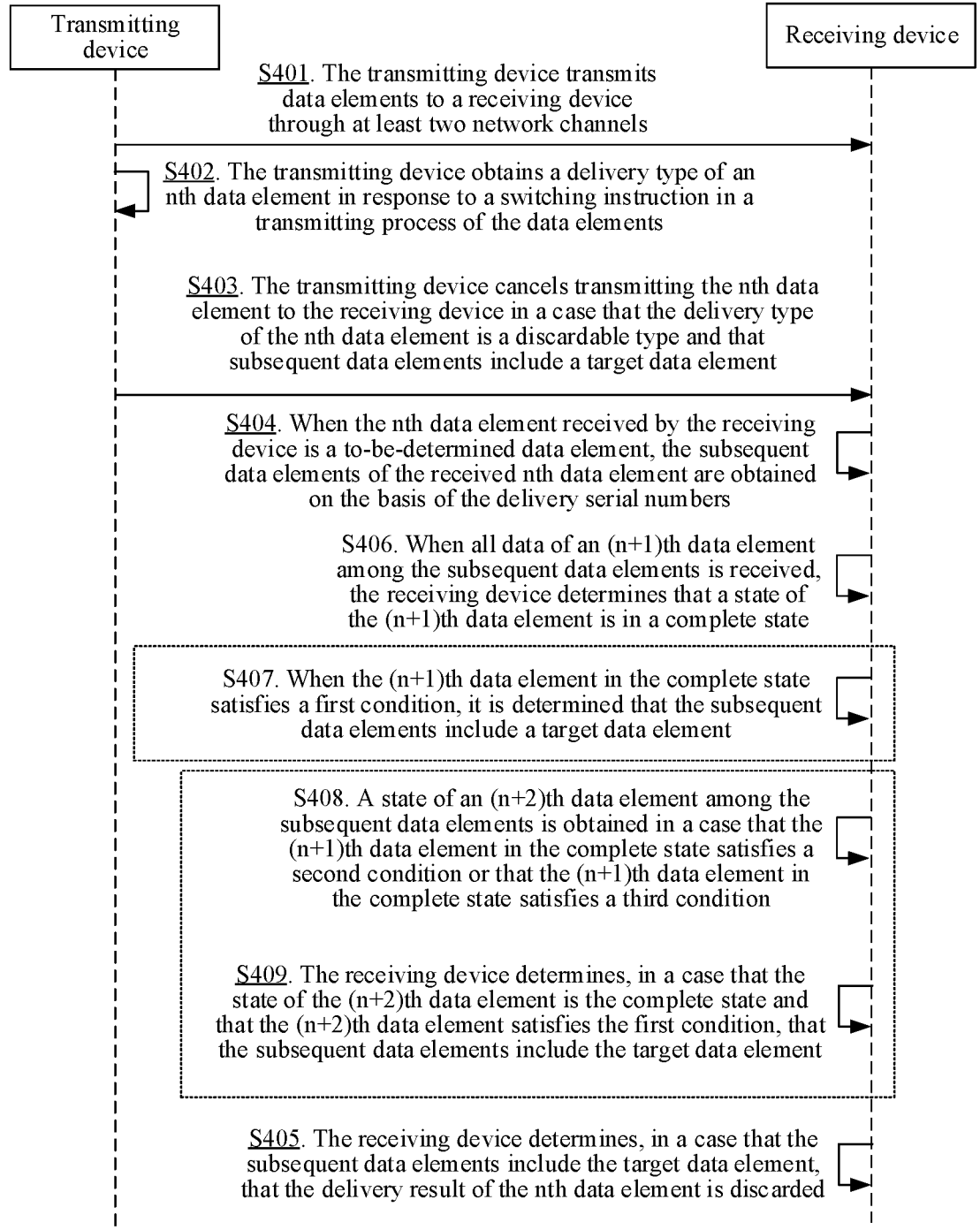
FIG. 6d is a flowchart II of a data processing method according to an embodiment of this application.

Referring to FIG. 6d, FIG. 6d is a flowchart II of a data processing method according to an embodiment of this application. As shown in FIG. 6d, in this embodiment of this application, after S404, the method further includes S406 and S407. That is, after the receiving device obtains the subsequent data elements of the received $n^{th}$ data element on the basis of the delivery serial numbers, the data processing method further includes S406 and S407. The various steps are separately explained below.

S406. When all data of an $(n+1)^{th}$ data element among the subsequent data elements is received, the receiving device determines that a state of the $(n+1)^{th}$ data element is in a complete state.

S407. When the $(n+1)^{th}$ data element in the complete state satisfies a first condition, it is determined that the subsequent data elements include a target data element.

In this embodiment of this application, when the receiving device determines that the $n^{th}$ data element is a to-be-determined data element, the receiving device obtains the $(n+1)^{th}$ data element, and determines a state and data type of the $(n+1)^{th}$ data element and whether the $(n+1)^{th}$ data element is an independent data element; and in a case of determining that the state of the $(n+1)^{th}$ data element is the complete state, that the data type is the same as the data type of the $n^{th}$ data element, and that the $(n+1)^{th}$ data element is an independent data element, the receiving device determines that the $(n+1)^{th}$ data element in the complete state satisfies the first condition. At this time, it is determined that the subsequent data elements include the target data element. It is easy to know that the subsequent data elements include the $(n+1)^{th}$ data element. The satisfying the first condition includes: having the same data type as the data type of the $n^{th}$ data element, and belonging to the independent data element.

The transmitting device may also use the processes described in S406 and S407 to determine whether the subsequent data elements include the target data element after determining to switch the network channel where the n' data element is transmitted and that the $n^{th}$ data element is of the discardable type.

Continue to refer to FIG. 6d, after S406, the method further includes S408 and S409. That is, after the receiving device determines that the state of the $(n+1)^{th}$ data element is the complete state, the data processing method further includes S408 and S409. The various steps are separately explained below.

S408. A state of an $(n+2)^{th}$ data element among the subsequent data elements is obtained when the $(n+1)^{th}$ data element in the complete state satisfies a second condition or that the $(n+1)^{th}$ data element in the complete state satisfies a third condition.

S409. The receiving device determines, when the state of the $(n+2)^{th}$ data element is the complete state and that the $(n+2)^{th}$ data element satisfies the first condition, that the subsequent data elements include the target data element.

In this embodiment of this application, when the receiving device determines that the state of the $(n+1)^{th}$ data element is the complete state, if the receiving device determines that the $(n+1)^{th}$ data element is an independent data element with the data type different from the data type of the $n^{th}$ data element (it indicates that the $(n+1)^{th}$ data element in the complete state satisfies the second condition), or determines that the $(n+1)^{th}$ data element is an associated data element with the same data type as the data type of the $n^{th}$ data element (it indicates that the $(n+1)^{th}$ data element in the complete state satisfies the third condition), the receiving device obtains the $(n+2)^{th}$ data element among the subsequent data elements, determines a state and data type of the $(n+2)^{th}$ data element and whether the $(n+2)^{th}$ data element is an independent data element; and in a case of determining that the state of the $(n+2)^{th}$ data element is the complete state, that the data type is the same as the data type of the $n^{th}$ data element, and that the $(n+2)^{th}$ data element is an independent data element, the receiving device determines that the $(n+2)^{th}$ data element in the complete state satisfies the first condition. At this time, it is determined that the subsequent data elements include the target data element. It is easy to know that the subsequent data elements include the $(n+2)^{th}$ data element. The satisfying the second condition includes: having the data type different from the data type of the $n^{th}$ data element, and belonging to the independent data element. The satisfying the third condition includes: having the same data type as the data type of the $n^{th}$ data element, and belonging to an associated data element.

A dependence degree of the associated data element on other data elements during post-processing is greater than or equal to the specified degree, that is, the associated data element is a data element for post-processing in combination with other data elements, and is opposite to the independent data element.

The transmitting device may also use the processes described in S406, S408, and S409 to determine that the subsequent data elements include the target data element after determining to switch the network channel where the $n^{th}$ data element is transmitted and that the $n^{th}$ data element is the discardable type.

Figure 6E:
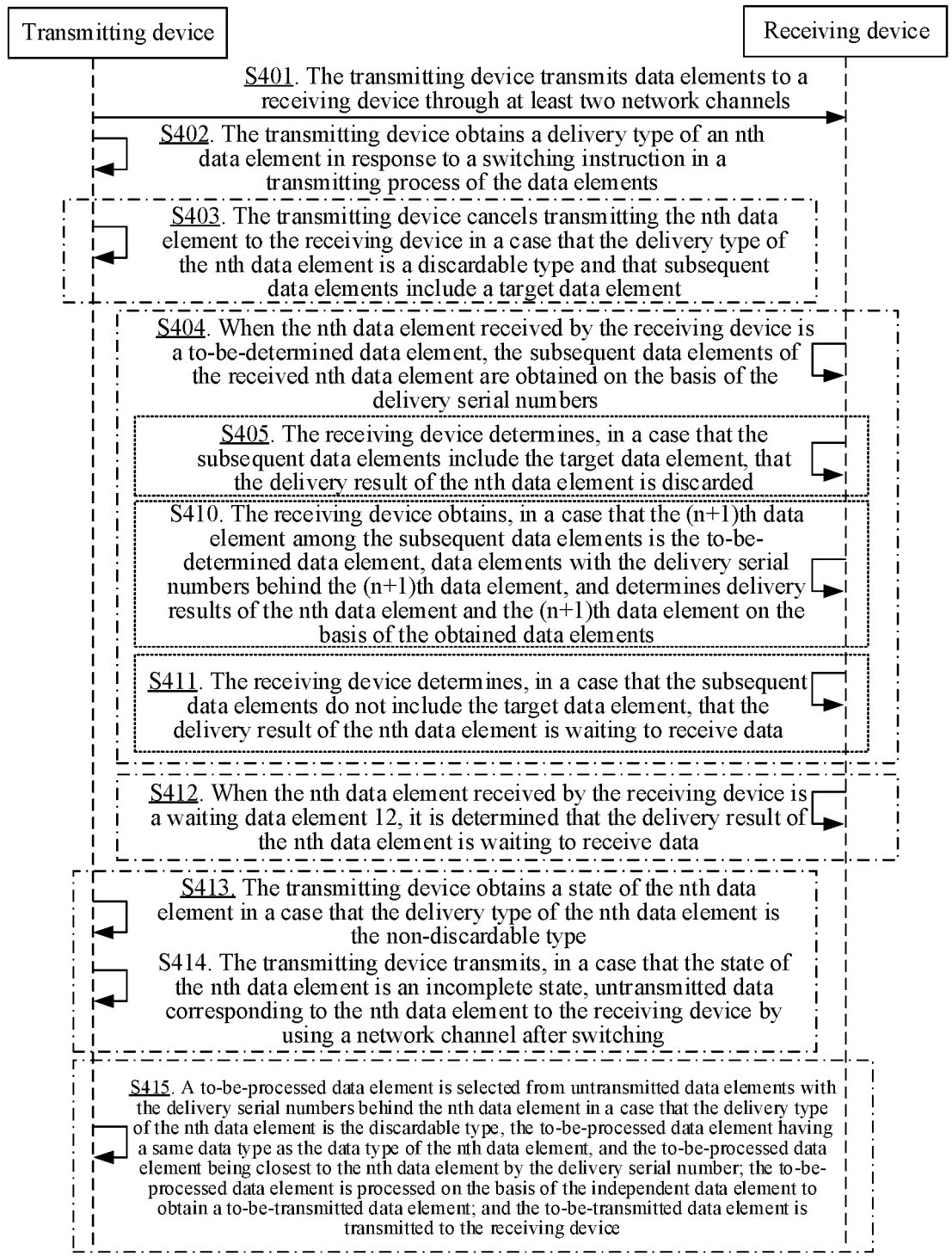
FIG. 6e is a flowchart III of a data processing method according to an embodiment of this application.

Referring to FIG. 6e, FIG. 6e is a flowchart III of a data processing method according to an embodiment of this application. As shown in FIG. 6e, in this embodiment of this application, in S404, after the receiving device obtains the subsequent data elements of the received $n^{th}$ data element on the basis of the delivery serial numbers, the data processing method further includes S410. The various steps are separately explained below.

S410. The receiving device obtains, when the $(n+1)^{th}$ data element among the subsequent data elements is the to-be-determined data element, data elements with the delivery serial numbers behind the $(n+1)^{th}$ data element, and determines delivery results of the $n^{th}$ data element and the $(n+1)^{th}$ data element on the basis of the obtained data elements.

In this embodiment of this application, when the receiving device determines that the state of the $(n+1)^{th}$ data element among the subsequent data elements is the incomplete state, and that the delivery type is the discardable type, the receiving device also determines that the $(n+1)^{th}$ data element is the to-be-determined data element. At this time, the receiving device uses descriptions similar to S404 and S405 to deliver the $(n+1)^{th}$ data element.

The transmitting device may also obtain, when the state of the $(n+1)^{th}$ data element among the subsequent data elements is the incomplete state and that the delivery type is the discardable type, the data elements with the delivery serial numbers behind the delivery serial number of the $(n+1)^{th}$ data element, and determines, on the basis of the obtained data elements, whether not to transmit remaining untransmitted data separately corresponding to the $n^{th}$ data element and the $(n+1)^{th}$ data element.

In this embodiment of this application, if the receiving device determines that the data elements in front of the $n^{th}$ data element are all in the incomplete states and have the discardable types, after the receiving device determines that the subsequent data elements include the target data element, the data elements, which are all in the incomplete states and have the discardable types, in front of the $n^{th}$ data element may be discarded.

Continue to refer to FIG. 6e, as shown in FIG. 6e, in this embodiment of this application, in S404, after the receiving device obtains the subsequent data elements of the received $n^{th}$ data element on the basis of the delivery serial numbers, the data processing method further includes S411. The various steps are separately explained below.

S411. The receiving device determines, when the subsequent data elements do not include the target data element, that the delivery result of the $n^{th}$ data element is waiting to receive data.

In this embodiment of this application, when the subsequent data elements include the data elements in the complete state, and the subsequent data elements do not include an independent data element having the same data type as the data type of the $n^{th}$ data element, it indicates that the subsequent data elements do not include the target data element. Thus, the receiving device determines that the subsequent data elements do not include a data element that can skip the $n^{th}$ data element to achieve the same post-processing result as the post-processing result of the $n^{th}$ data element. At this time, the receiving device determines that the delivery result of the $n^{th}$ data element is waiting for receiving the remaining unreceived data.

When the transmitting device determines that the subsequent data elements do not include the target data element, the transmitting device acknowledges and transmits the remaining untransmitted data of the $n^{th}$ data element.

Continue to refer to FIG. 6e. As shown in FIG. 6e, in this embodiment of this application, after the receiving device receives the data elements transmitted by the transmitting device through the at least two network channels, the data method further includes S412. This step will be explained below.

S412. When the $n^{th}$ data element received by the receiving device is a waiting data element, it is determined that the delivery result of the $n^{th}$ data element is waiting to receive data.

In this embodiment of this application, when the state of the $n^{th}$ data element received by the receiving device is the incomplete state, and the delivery type of the $n^{th}$ data element is the non-discardable type, it indicates that the $n^{th}$ data element is the waiting data element. Since the $n^{th}$ data element is the non-discardable type, if the $n^{th}$ data element is discarded, the $n^{th}$ data element cannot be depended on by other data element during post-processing and/or the degree of influence on the post-processing result is greater than the second degree threshold. Therefore, the receiving device waits for receiving the remaining unreceived data of the $n^{th}$ data element.

The receiving device determines that the corresponding delivery results are waiting to receive data for each incomplete non-discardable data element. Thus, after the subsequent data elements are obtained, if the subsequent data elements include a data element having the incomplete state and the non-discardable type, it is determined that the delivery result of the data element is waiting to receive data.

Continue to refer to FIG. 6e, as shown in FIG. 6e, after S402, the method further includes S413 and S414. That is, after the transmitting device obtains the delivery type of the $n^{th}$ data element, the data processing method further includes S413 and S414. The various steps are separately explained below.

S413. The transmitting device obtains a state of the $n^{th}$ data element when the delivery type of the $n^{th}$ data element is the non-discardable type.

In this embodiment of this application, during switching of the network channel for transmitting the $n^{th}$ data element, the transmitting device first determines the delivery type of the $n^{th}$ data element. If it is determined that the delivery type of the $n^{th}$ data element is the non-discardable type, the transmitting device needs to determine, through an acknowledge mechanism, whether the receiving device receives all the data of the $n^{th}$ data element, that is, to determine the state of the $n^{th}$ data element.

The non-discardable type refers to a type in which at least one of the dependence degree of other data elements and the degree of influence on the post-processing result is greater than the threshold.

S414. The transmitting device transmits, when the state of the $n^{th}$ data element is an incomplete state, untransmitted data corresponding to the $n^{th}$ data element to the receiving device by using a network channel after switching.

When the transmitting device determines, through the acknowledge mechanism, that the receiving device has received some data of the $n^{th}$ data element, the transmitting device determines that the state of the $n^{th}$ data element is the incomplete state. In addition, when using the acknowledge mechanism to determine the state of the $n^{th}$ data element, the transmitting device also determines remaining untransmitted data of the $n^{th}$ data element. The remaining untransmitted data is referred to here as untransmitted data. Thus, at this time, the transmitting device transmits the untransmitted data corresponding to the $n^{th}$ data element to the receiving device by using the network channel after switching.

Continue to refer to FIG. 6e, as shown in FIG. 6e, in this embodiment of this application, after S402, the method further includes S415. That is, after the transmitting device obtains the delivery type of the $n^{th}$ data element, the data processing method further includes S415. This step is explained below.

S415. A to-be-processed data element is selected from untransmitted data elements with the delivery serial numbers behind the $n^{th}$ data element when the delivery type of the $n^{th}$ data element is the discardable type, the to-be-processed data element having a same data type as the data type of the $n^{th}$ data element, and the to-be-processed data element being closest to the $n^{th}$ data element by the delivery serial number; the to-be-processed data element is processed on the basis of the independent data element to obtain a to-be-transmitted data element; and the to-be-transmitted data element is transmitted to the receiving device.

After the transmitting device switches the network channel, if the transmitting device determines that the delivery type of the $n^{th}$ data element is the discardable type, the transmitting device may process a data element having the same data type as the data type of the $n^{th}$ data element and having the closest delivery serial number as an independent data element among the untransmitted data elements with the delivery serial numbers behind the $n^{th}$ data element, so that the receiving device may discard the $n^{th}$ data element according to the fact that the received subsequent data elements include the target data element.

Correspondingly, in this embodiment of this application, the target data element among the subsequent data elements obtained by the receiving device obtains may be directly transmitted by the transmitting device or may be transmitted after being subjected to targeted processing by the transmitting device. This embodiment of this application does not limit this. The targeted processing is used for processing a data element having the same data type as the data type of the $n^{th}$ data element and having the closest delivery serial number as an independent data element.

It is understood that in the multichannel transmission process, when performing network channel switching, the transmitting device may generate an independent data element having the same data type as the data type of the $n^{th}$ data element. As a discarding signal instructing the receiving device to discard the $n^{th}$ data element, the receiving device discards the $n^{th}$ data element and continues to deliver the subsequent data elements, which shortens the retransmission acknowledge duration of data processing and improves the data processing efficiency of the multichannel transmission process.

In this embodiment of this application, the data elements include video frame data; the video frame data includes intra-prediction frame data and inter-prediction frame data; the intra-prediction frame data is an independent data element, and the delivery type of the intra-prediction frame data is the non-discardable type; the intra-prediction frame data renders a frame image on the basis of own data during post-processing; the inter-prediction frame data is an associated data element, and the delivery type of the inter-prediction frame data is the discardable type; the inter-prediction frame data renders a frame image on the basis of own data and the intra-prediction frame data during post-processing; and the intra-prediction frame data and the inter-prediction frame data have the same data type.

When the data transmitted through the multiple network channels is video data, the data elements include video frame data. Therefore, when the $n^{th}$ data element is of the discardable type, it indicates that the $n^{th}$ data element is inter-prediction frame data, for example, one-way prediction (P) frame data and bi-prediction (B) frame data. Thus, the independent data element being in the complete state among the subsequent data elements and having the same data type as the data type of the $n^{th}$ data element is the intra-prediction frame data, for example, I frame data.

In this embodiment of the application, the data elements further include audio frame data. At this time, the data transmitted through the multiple network channels is audio and video data. The audio frame data is an independent data element, and the delivery type of the audio frame data is the non-discardable type; and the data types of the audio frame data and the video frame data are different. That is, the independent data element in the complete state among the subsequent data elements and having the data type different from the data type of the $n^{th}$ data element is the audio frame data.

Figure 6F:
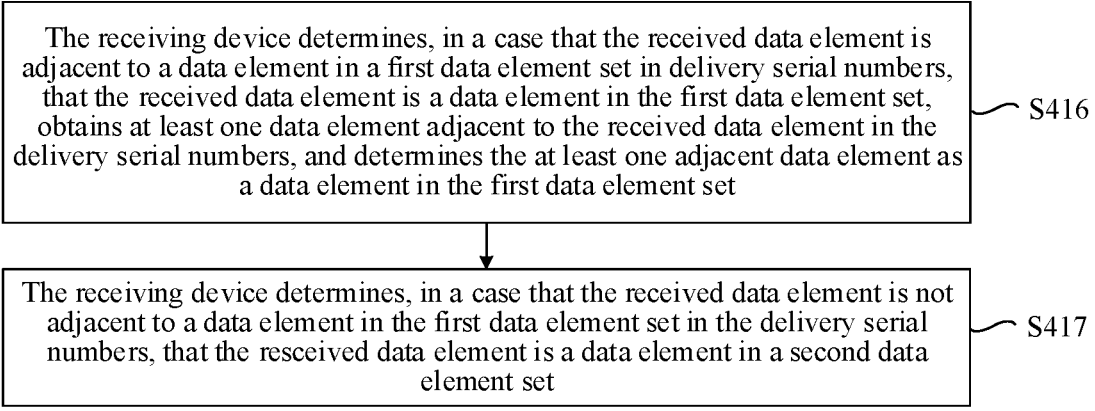
FIG. 6f is a flowchart IV of a data processing method according to an embodiment of this application.

Referring to FIG. 6f, FIG. 6f is a flowchart IV of a data processing method according to an embodiment of this application. As shown in FIG. 6f, in this embodiment of this application, after the receiving device receives the data elements transmitted by the transmitting device through the at least two network channels, the data processing method further includes S416 and S417. The various steps are separately explained below.

S416. The receiving device determines, when the received data element is adjacent to a data element in a first data element set in delivery serial numbers, that the received data element is a data element in the first data element set, obtains at least one data element adjacent to the received data element in the delivery serial numbers from the second data element set, and determines the at least one adjacent data element as a data element in the first data element set.

S417. The receiving device determines, when the received data element is not adjacent to a data element in the first data element set in the delivery serial numbers, that the received data element is a data element in a second data element set.

The receiving device stores the data elements received through the multiple network channels according to different types. One type includes to-be-delivered data elements that are adjacent (referred to as continuous) in the delivery serial numbers, and the other type includes data elements that are not adjacent (referred to as discontinuous) in the delivery serial numbers in the first data element set.

Correspondingly, in this embodiment of this application, in S404, the receiving device obtains subsequent data elements of the received $n^{th}$ data element on the basis of the delivery serial numbers, which includes: The receiving device obtains the subsequent data elements of the received $n^{th}$ data element from the first data element set and the second data element set on the basis of the delivery serial numbers.

The receiving device obtains data elements adjacent to the most recently delivered data element in the delivery serial numbers from the first data element set according to the delivery serial numbers. If it is determined in the delivery process that the state of a data element is the incomplete state, the received subsequent data elements are obtained from the first data element set and the second data element set to determine whether to wait for receiving data of the data element in the incomplete state or to discard the data element.

Figure 7:
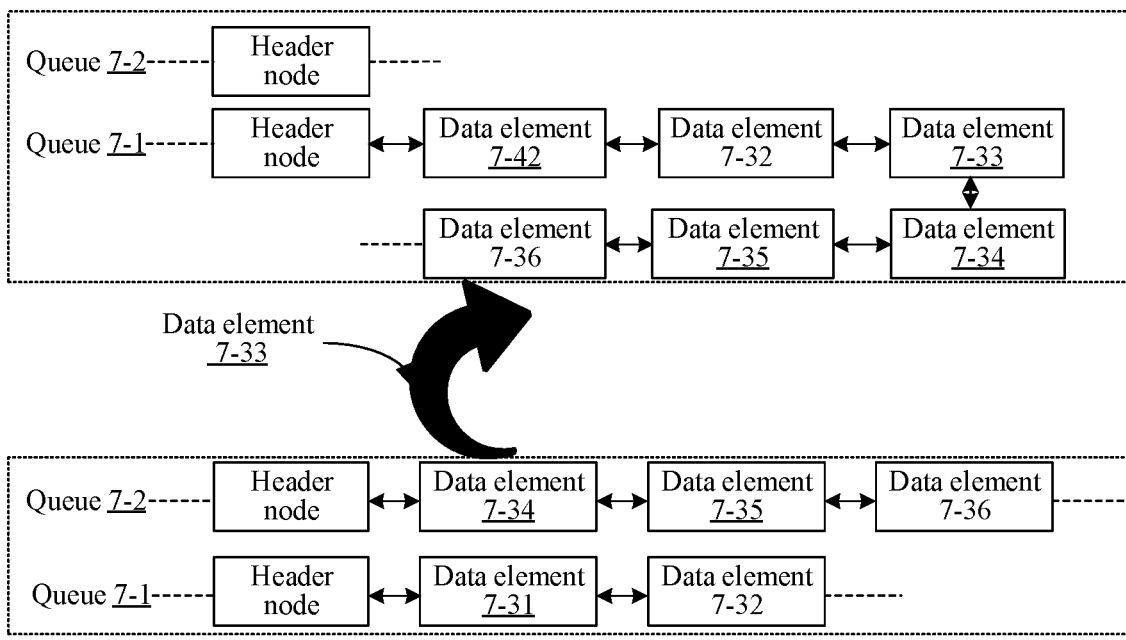
FIG. 7 is a schematic diagram of exemplary storage of a received data element according to an embodiment of this application.

For example, referring to FIG. 7, FIG. 7 is a schematic diagram of exemplary storage of a received data element according to an embodiment of this application. As shown in FIG. 7, when both the first data element set and the second data element set are stored in a queue, a queue 7-1 is used for storing the data elements in the first data element set, and a queue 7-2 is used for storing the data elements in the second data element set. When the delivery serial numbers of a data element 7-31 to a data element 7-36 are 1 to 6, the data element 7-31 to the data element 7-33 are transmitted through a network channel A, and the data element 7-34 to the data element 7-36 are transmitted through a network channel B. When a transmission speed of the network channel B is greater than a transmission speed of the network channel A, the receiving device first receives the data element 7-31, the data element 7-32, and the data element 7-34 to the data element 7-36. At this time, the receiving device stores the data element 7-31 and the data element 7-32 in the queue 7-1, and stores the data element 7-34 to the data element 7-36 in the queue 7-2. When the data element 7-33 is received later, the data element 7-33 is stored in the queue 7-1, and it is determined that the data element 7-34 to the data element 7-36 in the queue 7-2 are adjacent to the data element 7-33 in the delivery serial numbers, so the data element 7-34 to the data element 7-36 in the queue 7-2 are moved to the queue 7-1 for storage. A header node is used for pointing to a first data element in the queue.

It is understood that in this embodiment of this application, the receiving device receives the data elements transmitted through the multiple network channels through the first data element set and the second data element set. Since the data elements include the delivery serial numbers, the data elements need to be delivered in order according to the delivery serial numbers. Therefore, the receiving device continuously and discontinuously stores the received data elements, so that the to-be-delivered data elements can be quickly obtained from the first data element set during delivery, to improve the data processing efficiency.

An exemplary application of this embodiment of this application in one practical application scenario will be described below. This exemplary application describes a process of transmitting cloud gaming audio and video data from a cloud gaming server (for example, the server 300 in FIG. 1) to a user client (which may be a client run in a terminal, where the terminal is the terminal 200 in FIG. 1 for example) through multiple network channels in a cloud gaming application scenario.

Cloud gaming transmits audio and video data at a code rate greater than a specified code rate to achieve presentation of virtual scenario images, thus creating an immersive experience similar to local games. Therefore, the effect of cloud gaming depends on the smoothness of audio and video transmission and displaying.

Figure 8:
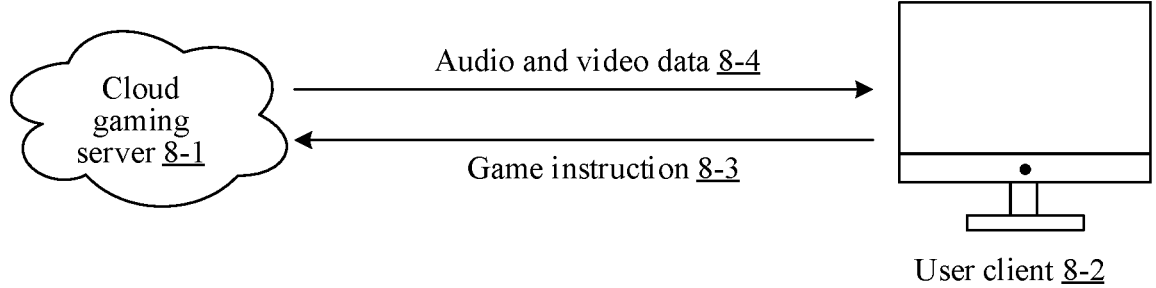
FIG. 8 is a schematic diagram of a cloud gaming application scenario according to an embodiment of this application.

Referring to FIG. 8, FIG. 8 is a schematic diagram of a cloud gaming application scenario according to an embodiment of this application. As shown in FIG. 8, a cloud gaming server 8-1 receives a game instruction 8-3 transmitted by a user client 8-2, and transmits audio and video data 8-4 (referred to as transmitted data) to the user client 8-2 in response to the game instruction 8-3.

Figure 9:
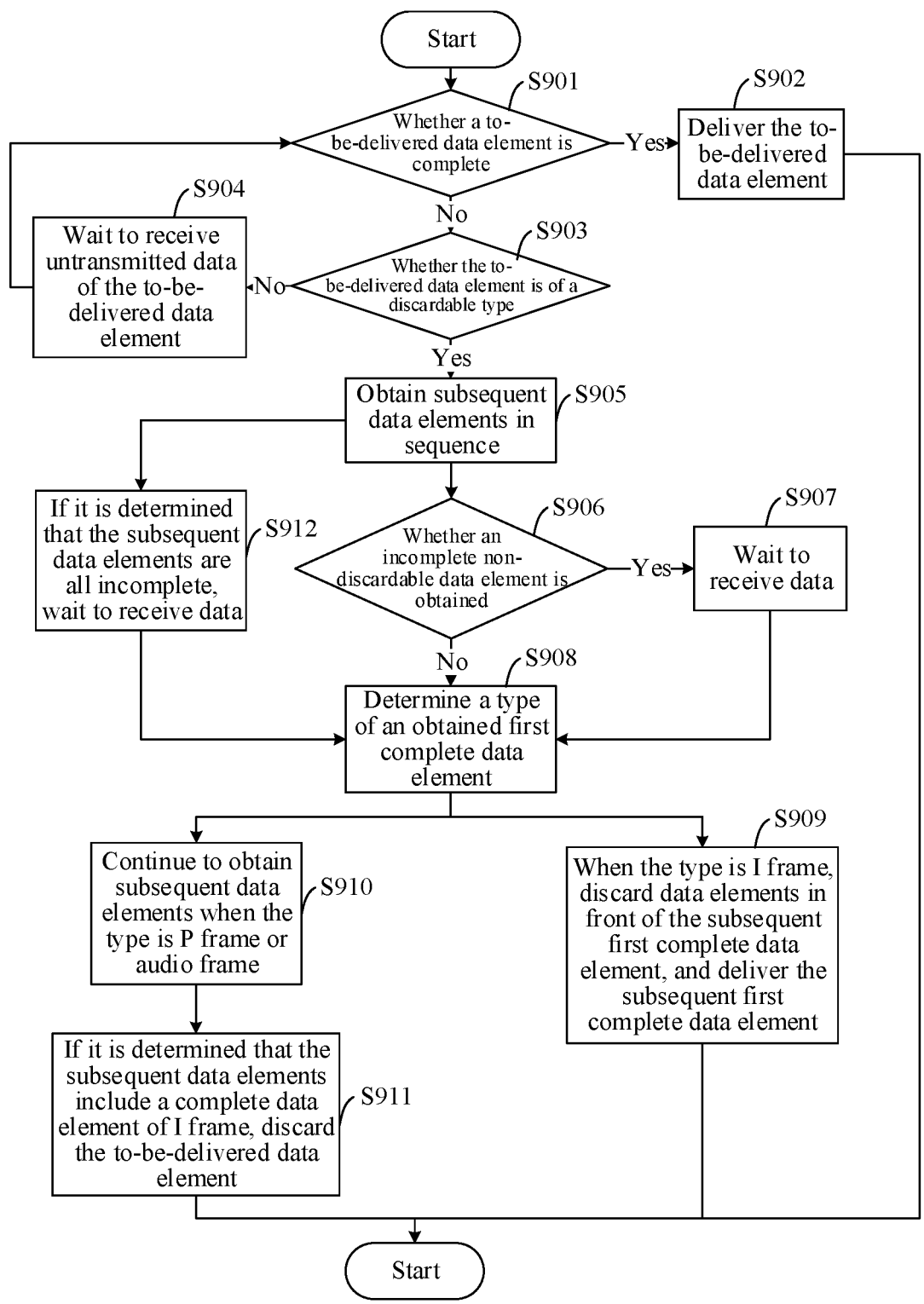
FIG. 9 is a flowchart I of exemplary data processing according to an embodiment of this application.

Referring to FIG. 9, FIG. 9 is a flowchart I of exemplary data processing according to an embodiment of this application. As shown in FIG. 9, the flow of the exemplary data processing includes S901 to S912. An executive body is a user client. The various steps are separately explained below.

S901. Determine whether a to-be-delivered data element (referred to as an $n^{th}$ data element) is complete; if yes, execute S902; and if no, execute S903.

At the beginning of this exemplary data processing, S901 is executed. The user client receives, through two queues (for example, the queue 7-1 and the queue 7-2 in FIG. 7) data elements transmitted by the cloud gaming server through multiple network channels. Thus, the user client first obtains a data element with the closest delivery serial number from the queue (for example, the queue 7-1 in FIG. 7) that stores the data elements adjacent to the most recently delivered data element in the delivery serial numbers, and then obtains the to-be-delivered data element. The user client determines whether the to-be-delivered data element is complete (that is, detects a state of the data element), and determines, on the basis of a completeness determination result, whether to deliver the to-be-delivered data element.

S902. Deliver the to-be-delivered data element. The to-be-delivered data element is deleted from the queue, and the data processing flow of delivering the to-be-delivered data element is ended.

The user client decodes the delivered data element to play audios and videos.

S903. Determine whether the to-be-delivered data element is of a discardable type; if no, execute S904; and if yes, execute S905.

When transmitting the data elements through the multiple network channels, the transmitting device carries the corresponding types and delivery serial numbers of the data elements in the data elements. A type of a data element includes a discardable type and a non-discardable type. When the data elements for data transmission through the multiple network channels are frame data, if video frames include an I frame and a P frame, the data elements are I frame data (referred to as intra-prediction frame data) and audio frame data which are both of the non-discardable types, and the data elements are P frame data (referred to as inter-prediction frame data) which is of a discardable type. This is because the I frame data may be directly decoded to obtain a complete picture, while a complete picture will be obtained by decoding the P frame data and the B frame data only if there is reference information. Therefore, when receiving the complete I frame data, the previous P frame data and B frame data can be discarded, and a game picture can be obtained by decoding the I frame data.

S904. Wait to receive untransmitted data of the to-be-delivered data element, and then execute S901 according to the received data.

If the incomplete to-be-delivered data element is the I frame data or the audio frame data, the incomplete to-be-delivered data element is of the non-discardable type. Since the loss of the I frame data affects decoding (referred to as post-processing) of subsequent data elements, and the loss of the audio frame data affects rendering of audios, the device cannot discard the to-be-delivered data element, but continue to waiting to receive data.

S905. Obtain later data elements (referred to as subsequent data elements) in sequence, and then execute S906 and S912.

The user client scans the data elements in the two queues to obtain the data elements behind a data element with the closest delivery serial number, thus obtaining the subsequent data elements.

S906. Determine whether an incomplete non-discardable data element is obtained; if yes, execute S907; and if no, execute S908.

In the process that the user client scans the queues to obtain the subsequent data elements, if a complete data element is scanned first, instead of an incomplete non-discardable data element, the type of the data element is determined; if an incomplete non-discardable data element is scanned, scanning is stopped to waiting to receive data.

S907. Wait to receive data, and execute S908 on the basis of the received data.

S908. Determine a type of an obtained first complete data element.

S909. When the type is I frame, discard data elements in front of the subsequent first complete data element, and deliver the subsequent first complete data element; and delete the to-be-delivered data element from the queue, and end the data processing flow of delivering the to-be-delivered data element.

A type includes a result indicating whether data types are the same and a result indicating whether a data element is an independent data element or an associated data element. If the type is I frame, it indicates that the subsequent first complete data element refers to an independent data element having the same data type as the data type of the to-be-delivered data element (P frame data), so that the subsequent first complete data element is delivered, and the data elements in front of the subsequent first complete data element are discarded.

S910. Continue to obtain subsequent data elements when the type is P frame or audio frame.

If the type is P frame, it indicates that the subsequent first complete data element refers to an associated data element having the same data type as the data type of the to-be-delivered data element (P frame data). If the type is audio frame, it indicates that the subsequent first complete data element is an independent data element having the data type different from the data type of the to-be-delivered data element (P frame data). At this time, the user client also needs to further determine the subsequent data elements.

S911. If it is determined that the subsequent data elements include a complete data element of I frame, discard the to-be-delivered data element, and end the data processing flow of delivering the to-be-delivered data element.

S912. If it is determined that the subsequent data elements are all incomplete, wait to receive data, and then execute S908 according to the received data.

Correspondingly, in this embodiment of this application, during the network channel switching, if the cloud gaming server first determines that the delivery type of the data element transmitted in the switched network channel is the discardable type, that is, determines the data element is P frame data, the cloud gaming server will not acknowledge retransmission, while if the cloud gaming server determines that the subsequent data elements include a complete data element of I frame, the cloud gaming server directly transmits the subsequent data elements. If the cloud gaming server determines that the delivery type of the data element transmitted in the switched network channel is the non-discardable type, that is, determines that the data element is I frame data or audio frame data, the cloud gaming server acknowledges retransmission.

Figure 10:
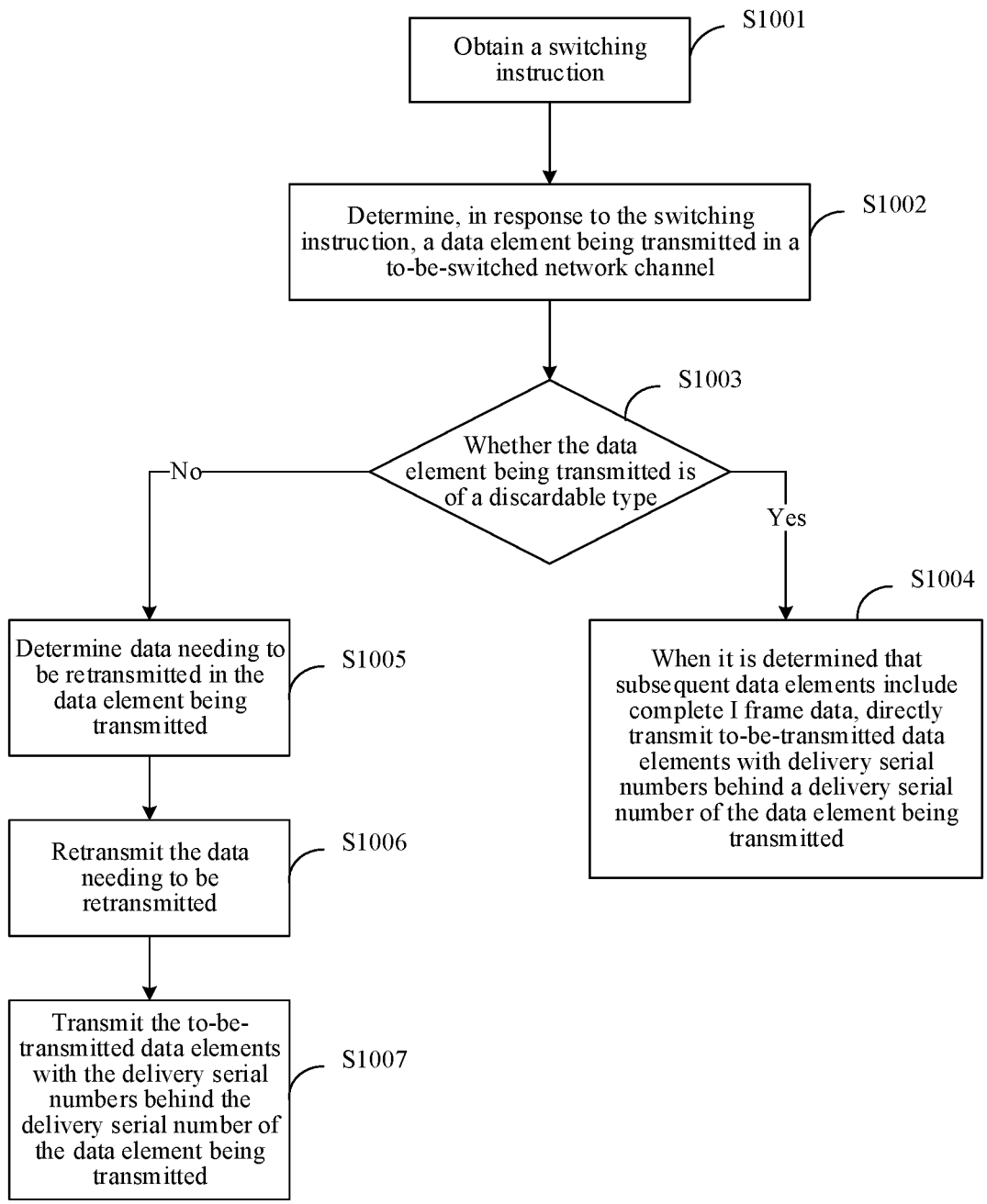
FIG. 10 is a flowchart II of exemplary data processing according to an embodiment of this application.

For example, referring to FIG. 10, FIG. 10 is a flowchart II of exemplary data processing according to an embodiment of this application. As shown in FIG. 10, the flow of the exemplary data processing includes S1001 to S1007. An executive body is a cloud gaming server. The various steps are separately explained below.

S1001. Obtain a switching instruction.

Switching of network channels may be triggered by the cloud gaming server. At this time, the obtained switching instruction is generated by the cloud gaming server. That is, the switching of the network channels is a decision result of the cloud gaming server.

S1002. Determine, in response to the switching instruction, a data element (referred to as an $n^{th}$ data element) being transmitted in a to-be-switched network channel.

S1003. Determine whether the data element being transmitted is of a discardable type; if yes, execute S1004; and if no, execute S1005.

S1004. When it is determined that subsequent data elements include complete I frame data, directly transmit to-be-transmitted data elements with delivery serial numbers behind a delivery serial number of the data element being transmitted.

The complete I frame data included in the subsequent data elements may be obtained by coding video frames by the cloud gaming server in time in a coding manner of the I frame data during the switching of the network channels, instead of using a coding manner of the P frame data. In this way, the I frame data is transmitted to trigger the user client to discard the incomplete P frame data, so that the user client can end picture lag, thereby reducing a picture lag duration.

It is understood that the cloud gaming server will no longer acknowledge retransmission during the switching of the network channels, which reduces the resource consumption of acknowledgment and retransmission.

S1005. Determine data needing to be retransmitted in the data element being transmitted.

S1006. Retransmit the data needing to be retransmitted.

S1007. Transmit the to-be-transmitted data elements with the delivery serial numbers behind the delivery serial number of the data element being transmitted.

It is understood that by discarding the incomplete P frame data, the user client and the cloud gaming server can improve the stability and fluency of audios and videos transmitted through the multiple network channels by the cloud gaming application scenario in a complicated network environment. That is, different processing policies (discard or wait) are formed for different data to simplify the transmitting and receiving logics of the two sides during the network channel switching, thereby reducing a duration for restoring pictures during the network channel switching, and improving the data processing efficiency.

An exemplary structure of a first data processing apparatus 255 implemented as a software module and provided by an embodiment of this application is continuously described below. In some embodiments, as shown in FIG. 2, software modules stored in the first data processing apparatus 255 of a first memory 250 may include:

a data receiving module 2551, configured to receive, through at least two network channels, data elements transmitted by a transmitting device, the data elements including delivery serial numbers; and a delivery processing module 2552, configured to: obtain subsequent data elements of the received $n^{th}$ data element on the basis of the delivery serial numbers when a received $n^{th}$ data element is a to-be-determined data element, a state of the to-be-determined data element being an incomplete state, and a delivery type of the to-be-determined data element being a discardable type, the state being determined on the basis of whether all data of the data elements is received, and the delivery type being determined on the basis of two kinds of information: a dependence degree of other data elements on the data element during post-processing and a degree of influence on a post-processing result, and n being a positive integer.

The delivery processing module 2552 is further configured to: determine, when the subsequent data elements include a target data element, that a delivery result of the $n^{th}$ data element is discarded, a state of the target data element being a complete state, the target data element having a same data type as the data type of the $n^{th}$ data element, the target data element being an independent data element, the data type being determined on the basis of an effect of the data element, and a dependence degree of the independent data element on other data elements during post-processing being less than a specified degree.

In this embodiment of this application, the delivery processing module 2552 is further configured to: determine, when all data of an $(n+1)^{th}$ data element among the subsequent data elements is received, that a state of the $(n+1)^{th}$ data element is the complete state; and determine, when the $(n+1)^{th}$ data element in the complete state satisfies a first condition, that the subsequent data elements include the target data element, wherein the satisfying the first condition includes: having the same data type as the data type of the $n^{th}$ data element, and belonging to the independent data element.

In this embodiment of this application, the delivery processing module 2552 is further configured to: obtain a state of an $(n+2)^{th}$ data element among the subsequent data elements when the $(n+1)^{th}$ data element in the complete state satisfies a second condition or that the $(n+1)^{th}$ data element in the complete state satisfies a third condition, the satisfying the second condition including: having the data type different from the data type of the $n^{th}$ data element, and belonging to the independent data element; the satisfying the third condition including: having the same data type as the data type of the $n^{th}$ data element, and belonging to an associated data element; a dependence degree of the associated data element on other data elements during post-processing being greater than or equal to the specified degree; and determine, when the state of the $(n+2)^{th}$ data element is the complete state and that the $(n+2)^{th}$ data element satisfies the first condition, that the subsequent data elements include the target data element.

In this embodiment of this application, the delivery processing module 2552 is further configured to: obtain the data elements with the delivery serial numbers behind the delivery serial number of the $(n+1)^{th}$ data element when the $(n+1)^{th}$ data element among the subsequent data elements is a to-be-determined data element, and determine delivery results of the $n^{th}$ data element and the $(n+1)^{th}$ data element on the basis of the obtained data elements.

In this embodiment of this application, the delivery processing module 2552 is further configured to determine, when the subsequent data elements do not include the target data element, that the delivery result of the $n^{th}$ data element is waiting to receive data.

In this embodiment of this application, the delivery processing module 2552 is further configured to determine, when the received $n^{th}$ data element is a waiting data element, that the delivery result of the $n^{th}$ data element is waiting for receiving data, the state of the waiting data element being the incomplete state, and the delivery type of the waiting data element being a non-discardable type.

In this embodiment of this application, the data elements include video frame data; the video frame data includes intra-prediction frame data and inter-prediction frame data; the intra-prediction frame data is an independent data element, and the delivery type of the intra-prediction frame data is the non-discardable type; the intra-prediction frame data renders a frame image on the basis of own data during post-processing; the inter-prediction frame data is an associated data element, and the delivery type of the inter-prediction frame data is the discardable type; the inter-prediction frame data renders a frame image on the basis of own data and the intra-prediction frame data during post-processing; and the intra-prediction frame data and the inter-prediction frame data have the same data type.

In this embodiment of this application, the data elements further include audio frame data; the audio frame data is an independent data element; the delivery type of the audio frame data is the non-discardable type; and the audio frame data and the video frame data have different data types.

In this embodiment of this application, the data receiving module 2551 is further configured to: determine, when the received data element is adjacent to the most recently delivered data element in the delivery serial numbers, that the received data element is a data element in a first data element set, obtain at least one data element adjacent to the received data element in the delivery serial numbers from a second data element set, and determine the at least one adjacent data element as a data element in the first data element set; and determine, when the received data element is not adjacent to the most recently delivered data element in the delivery serial numbers, that the received data element is a data element in a second data element set.

In this embodiment of this application, the data receiving module 2551 is further configured to obtain the subsequent data elements of the received $n^{th}$ data element from the first data element set and the second data element set on the basis of the delivery serial numbers.

An embodiment of this application further provides a computer program product or a computer program, the computer program product or the computer program including computer instructions stored in a computer-readable memory. A first processor of a receiving device reads the computer instructions from the computer-readable storage medium, and executes the computer instructions, so that the receiving device implements the data processing method applied to the receiving device side of the embodiments of this application.

An exemplary structure of a second data processing apparatus 355 implemented as a software module and provided by an embodiment of this application is continuously described below. In some embodiments, as shown in FIG. 3, software modules stored in the second data processing apparatus 355 of a second memory 350 may include:

a data transmission module 3551, configured to transmit data elements to a receiving device through at least two network channels, the data elements including delivery serial numbers;

a channel switching module 3552, configured to obtain a delivery type of an $n^{th}$ data element in response to a switching instruction in a transmitting process of the data elements, the switching instruction being used for switching the network channel used for transmitting the $n^{th}$ data element, and the delivery type being determined on the basis of following two kinds of information: a dependence degree of other data elements on the data element during post-processing and a degree of influence on a post-processing result, and n being a positive integer; and a switching processing module 3553, configured to: cancel transmitting the $n^{th}$ data element to the receiving device when the delivery type of the $n^{th}$ data element is a discardable type and that subsequent data elements include a target data element, the subsequent data elements being transmitted data elements with delivery serial numbers behind the $n^{th}$ data element, a state of the target data element being a complete state, the target data element having a same data type as a data type of the $n^{th}$ data element, the target data element being an independent data element, the state being determined on the basis of whether the receiving device receives all data of the data elements, the data type being determined on the basis of an effect of the data element, and a dependence degree of the independent data element on other data elements during post-processing being less than a specified degree.

In this embodiment of this application, the switching processing module 3553 is further configured to: obtain a state of the $n^{th}$ data element when the delivery type of the $n^{th}$ data element is a non-discardable type; and transmit, when the state of the $n^{th}$ data element is an incomplete state, untransmitted data corresponding to the $n^{th}$ data element to the receiving device by using a network channel after switching.

In this embodiment of this application, the switching processing module 3553 is further configured to: select a to-be-processed data element from untransmitted data elements with the delivery serial numbers behind the $n^{th}$ data element when the delivery type of the $n^{th}$ data element is the discardable type, the to-be-processed data element having a same data type as the data type of the $n^{th}$ data element, and the to-be-processed data element being closest to the $n^{th}$ data element by the delivery serial number; process the to-be-processed data element on the basis of the independent data element to obtain a to-be-transmitted data element; and transmit the to-be-transmitted data element to the receiving device.

An embodiment of this application further provides a computer program product or a computer program, the computer program product or the computer program including computer instructions stored in a computer-readable memory. A second processor of a transmitting device reads the computer instructions from the computer-readable storage medium, and executes the computer instructions, so that the transmitting device implements the data processing method applied to the transmitting device side of the embodiments of this application.

The embodiments of this application provide a computer-readable storage medium, storing computer-executable instructions. When the computer-executable instructions are executed by a first processor, the first processor is caused to implement the data processing method applied to the receiving device side according to the embodiments of this application. When the computer-executable instructions are executed by a second processor, the second processor is caused to implement the data processing method applied to the transmitting device side according to the embodiments of this application, for example, the data processing method as shown in FIG. 4.

In some embodiments, the computer-readable storage medium may be a ferroelectric random access memory (FRAM), a read only memory (ROM), a programmable ROM (PROM), an erasable PROM (EPROM), an electrically EPROM (EEPROM), a flash memory, a magnetic surface memory, an optical disk, a CD-ROM, or the like. The computer-readable storage medium may include one or any combination of the aforementioned memories.

In some embodiments, the computer-executable instructions may be in the form of programs, software, software modules, scripts, or codes, written in any form of programming language (including a compiling or interpreting language, or a declarative or procedural language), and may be deployed in any form, including being deployed as stand-alone programs or as modules, components, subroutines, or other units suitable for use in computing environments.

For example, the computer-executable instructions may, but may not necessarily correspond to files in a file system, and may be stored as part of a file that stores other programs or data, such as in one or more scripts stored in a Hyper Text Markup Language (HTML) document, in a single file dedicated to a discussed program, or in multiple collaborative files (such as files that store one or more modules, subroutines, or codes).

For example, the computer-executable instructions may be deployed as being executed on one electronic device (at this time, this electronic device is the receiving device or the transmitting device), or being executed on multiple electronic devices located at the same site (at this time, the multiple electronic devices located at the same site are the receiving device or the transmitting device), or being executed on multiple electronic devices distributed at multiple sites and interconnected by a communication network (at this time, the multiple electronic devices distributed at the multiple sites and interconnected by the communication network are the receiving device or the transmitting device).

It is understood that in the embodiments of this application, where relevant data such as events is involved, when the embodiments of this application are applied to a specific product or technology, it is necessary to obtain permissions or agreements of users, and the collection, use and processing of the relevant data are required to comply with the relevant laws, regulations and standards of relevant countries and districts.

In summary, in the embodiments of this application, in a multichannel transmission process, when some data of a data element currently received by a receiver is received due to network channel switching, if the currently received data element is a discardable type, it indicates that a dependence degree of other data elements on the currently received data element during post-processing and a degree of influence on a post-processing result are both relatively low. Then, if it is determined that the subsequent data elements with the delivery serial numbers behind the currently received data element include a data element capable of independently completing post-processed data elements having the same effect as the effect of the currently received data element, the transmitting device directly transmits the subsequent data elements, and the receiving device discards the currently received data element. In this way, a duration of confirming retransmission of the transmitting device and a duration of waiting for data of the receiving device are reduced. Thus, the data element transmission time costs of network channel switching and the complexity of network channel switching can be reduced, and the data processing efficiency in the process of multichannel transmission can be improved. In addition, when the transmitted data elements are audio frame data and video frame data, or are video frame data, the rendering fluency of video pictures can be improved, and a playing effect of videos or audios and videos can be improved.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely embodiments of this application and are not intended to limit the protection scope of this application. Any modification, equivalent replacement, and improvement made within the spirit and scope of this application shall fall within the protection scope of this application.

What is claimed is:

1. A data processing method, performed by a receiving device and the method comprising:
   receiving, through at least two network channels, data elements transmitted by a transmitting device, the data elements comprising delivery serial numbers;
   responsive to receiving $n^{th}$ data element, n being a positive number:
   determining a state of the $n^{th}$ data element on the basis of whether all data of the $n^{th}$ data element has been received; and
   determining a delivery type of the $n^{th}$ data element on the basis of a dependence degree of subsequent data elements on the $n^{th}$ data element during post-processing of the subsequent data elements and a degree of influence the $n^{th}$ data element on the post-processing result;
   when the state of the $n^{th}$ data element is an incomplete state and the delivery type of the $n^{th}$ data element is a discardable type:
   obtaining the subsequent data elements on the basis of their corresponding delivery serial numbers, the subsequent data elements comprising a target data element; and
   determining a state of the target data element;
   when the state of the target data element is a complete state:
   determining a data type of the target data element on the basis of an effect of the target data element on the other data elements;
   when the data type of the target data element is the same data type as that of the $n^{th}$ data element:
   determining a dependence degree of the target data element on the other data elements during the post-processing of the subsequent data elements; and
   when the dependence degree of the target data element is less than a specified degree:
   determining that the target data element is an independent data element and a delivery result of the $n^{th}$ data element is discarded; and
   discarding the $n^{th}$ data element during the post-processing of the subsequent data elements.

2. The method according to claim 1, further comprising:
   determining, when all data of an $(n+1)^{th}$ data element among the subsequent data elements is received, that a state of the $(n+1)^{th}$ data element is the complete state; and
   determining, when the $(n+1)^{th}$ data element in the complete state satisfies a first condition, that the subsequent data elements comprise the target data element, wherein the satisfying the first condition comprises: having the same data type as the data type of the $n^{th}$ data element, and belonging to the independent data element.

3. The method according to claim 1, further comprising:
   obtaining the data elements with the delivery serial numbers behind the delivery serial number of the $(n+1)^{th}$ data element when the $(n+1)^{th}$ data element among the subsequent data elements is the target data element, and determining delivery results of the $n^{th}$ data element and the $(n+1)^{th}$ data element on the basis of the obtained data elements.

4. The method according to claim 1, further comprising:
   determining, when the subsequent data elements do not comprise the target data element, that the delivery result of the $n^{th}$ data element is waiting to receive data.

5. The method according to claim 1, further comprising:
   determining, when the received $n^{th}$ data element is a waiting data element, that the delivery result of the $n^{th}$ data element is waiting to receive data, the state of the waiting data element being the incomplete state, and the delivery type of the waiting data element being a non-discardable type.

6. The method according to claim 1, further comprising:
   determining, when the received data element is adjacent to the most recently delivered data element in the delivery serial numbers, that the received data element is a data element in a first data element set, obtaining at least one data element adjacent to the received data element in the delivery serial numbers from a second data element set, and determining the at least one adjacent data element as a data element in the first data element set; and
   determining, when the received data element is not adjacent to the most recently delivered data element in the delivery serial numbers, that the received data element is a data element in a second data element set; and
   obtaining the subsequent data elements of the received $n^{th}$ data element from the first data element set and the second data element set on the basis of the delivery serial numbers.

7. A receiving device for data processing, comprising:
   a first memory, configured to store computer-executable instructions; and
   a first processor, configured to implement a data processing method by executing the computer-executable instructions stored in the first memory, the data processing method including:
   receiving, through at least two network channels, data elements transmitted by a transmitting device, the data elements comprising delivery serial numbers;
   responsive to receiving $n^{th}$ data element, n being a positive number:
   determining a state of the $n^{th}$ data element on the basis of whether all data of the $n^{th}$ data element has been received; and
   determining a delivery type of the $n^{th}$ data element on the basis of a dependence degree of subsequent data elements on the $n^{th}$ data element during post-processing of the subsequent data elements and a degree of influence the $n^{th}$ data element on the post-processing result;
   when the state of the $n^{th}$ data element is an incomplete state and the delivery type of the $n^{th}$ data element is a discardable type:

obtaining the subsequent data elements on the basis of their corresponding delivery serial numbers, the subsequent data elements comprising a target data element; and determining a state of the target data element;

when the state of the target data element is a complete state:

determining a data type of the target data element on the basis of an effect of the target data element on the other data elements;

when the data type of the target data element is the same data type as that of the $n^{th}$ data element:

determining a dependence degree of the target data element on the other data elements during the post-processing of the subsequent data elements; and when the dependence degree of the target data element is less than a specified degree:

determining that the target data element is an independent data element and a delivery result of the $n^{th}$ data element is discarded; and discarding the $n^{th}$ data element during the post-processing of the subsequent data elements.

8. The receiving device according to claim 7, wherein the method further comprises:

determining, when all data of an $(n+1)^{th}$ data element among the subsequent data elements is received, that a state of the $(n+1)^{th}$ data element is the complete state; and determining, when the $(n+1)^{th}$ data element in the complete state satisfies a first condition, that the subsequent data elements comprise the target data element, wherein the satisfying the first condition comprises: having the same data type as the data type of the $n^{th}$ data element, and belonging to the independent data element.

9. The receiving device according to claim 7, wherein the method further comprises:

obtaining the data elements with the delivery serial numbers behind the delivery serial number of the $(n+1)^{th}$ data element when the $(n+1)^{th}$ data element among the subsequent data elements is the target data element, and determining delivery results of the $n^{th}$ data element and the $(n+1)^{th}$ data element on the basis of the obtained data elements.

10. The receiving device according to claim 7, wherein the method further comprises:

determining, when the subsequent data elements do not comprise the target data element, that the delivery result of the $n^{th}$ data element is waiting to receive data.

11. The receiving device according to claim 7, wherein the method further comprises:

determining, when the received $n^{th}$ data element is a waiting data element, that the delivery result of the $n^{th}$ data element is waiting to receive data, the state of the waiting data element being the incomplete state, and the delivery type of the waiting data element being a non-discardable type.

12. The receiving device according to claim 7, wherein the method further comprises:

determining, when the received data element is adjacent to the most recently delivered data element in the delivery serial numbers, that the received data element is a data element in a first data element set, obtaining at least one data element adjacent to the received data element in the delivery serial numbers from a second data element set, and determining the at least one adjacent data element as a data element in the first data element set; and determining, when the received data element is not adjacent to the most recently delivered data element in the delivery serial numbers, that the received data element is a data element in a second data element set; and obtaining the subsequent data elements of the received $n^{th}$ data element from the first data element set and the second data element set on the basis of the delivery serial numbers.

13. A non-transitory computer-readable storage medium, storing computer-executable instructions, the computer-executable instructions, when executed by a processor of a receiving device, causing the receiving device to perform a data processing method, the method including:

receiving, through at least two network channels, data elements transmitted by a transmitting device, the data elements comprising delivery serial numbers;

responsive to receiving $n^{th}$ data element, n being a positive number:

determining a state of the $n^{th}$ data element on the basis of whether all data of the $n^{th}$ data element has been received; and determining a delivery type of the $n^{th}$ data element on the basis of a dependence degree of subsequent data elements on the $n^{th}$ data element during post-processing of the subsequent data elements and a degree of influence the $n^{th}$ data element on the post-processing result;

when the state of the $n^{th}$ data element is an incomplete state and the delivery type of the $n^{th}$ data element is a discardable type:

obtaining the subsequent data elements on the basis of their corresponding delivery serial numbers, the subsequent data elements comprising a target data element; and determining a state of the target data element;

when the state of the target data element is a complete state:

determining a data type of the target data element on the basis of an effect of the target data element on the other data elements;

when the data type of the target data element is the same data type as that of the $n^{th}$ data element:

determining a dependence degree of the target data element on the other data elements during the post-processing of the subsequent data elements; and when the dependence degree of the target data element is less than a specified degree:

determining that the target data element is an independent data element and a delivery result of the $n^{th}$ data element is discarded; and discarding the $n^{th}$ data element during the post-processing of the subsequent data elements.

14. The non-transitory computer-readable storage medium according to claim 13, wherein the method further comprises:

determining, when all data of an $(n+1)^{th}$ data element among the subsequent data elements is received, that a state of the $(n+1)^{th}$ data element is the complete state; and determining, when the $(n+1)^{th}$ data element in the complete state satisfies a first condition, that the subsequent data elements comprise the target data element, wherein the satisfying the first condition comprises:

having the same data type as the data type of the $n^{th}$ data element, and belonging to the independent data element.

15. The non-transitory computer-readable storage medium according to claim 13, wherein the method further comprises:
obtaining the data elements with the delivery serial numbers behind the delivery serial number of the $(n+1)^{th}$ data element when the $(n+1)^{th}$ data element among the subsequent data elements is the target data element, and determining delivery results of the $n^{th}$ data element and the $(n+1)^{th}$ data element on the basis of the obtained data elements.

16. The non-transitory computer-readable storage medium according to claim 13, wherein the method further comprises:
determining, when the subsequent data elements do not comprise the target data element, that the delivery result of the $n^{th}$ data element is waiting to receive data.

17. The non-transitory computer-readable storage medium according to claim 13, wherein the method further comprises:
determining, when the received $n^{th}$ data element is a waiting data element, that the delivery result of the $n^{th}$ data element is waiting to receive data, the state of the waiting data element being the incomplete state, and the delivery type of the waiting data element being a non-discardable type.

18. The non-transitory computer-readable storage medium according to claim 13, wherein the method further comprises:
determining, when the received data element is adjacent to the most recently delivered data element in the delivery serial numbers, that the received data element is a data element in a first data element set, obtaining at least one data element adjacent to the received data element in the delivery serial numbers from a second data element set, and determining the at least one adjacent data element as a data element in the first data element set; and
determining, when the received data element is not adjacent to the most recently delivered data element in the delivery serial numbers, that the received data element is a data element in a second data element set; and
obtaining the subsequent data elements of the received $n^{th}$ data element from the first data element set and the second data element set on the basis of the delivery serial numbers.

* * * * *